United States Patent
Yang

(10) Patent No.: US 9,311,636 B2
(45) Date of Patent: Apr. 12, 2016

(54) MOBILE PAYMENT METHOD AND MOBILE PAYMENT APPARATUS

(71) Applicant: Chien-Kang Yang, Taipei (TW)

(72) Inventor: Chien-Kang Yang, Taipei (TW)

( * ) Notice: Subject to any disclaimer, the term of this patent is extended or adjusted under 35 U.S.C. 154(b) by 0 days.

(21) Appl. No.: 14/623,338

(22) Filed: Feb. 16, 2015

(65) Prior Publication Data

US 2015/0161591 A1    Jun. 11, 2015

Related U.S. Application Data

(63) Continuation-in-part of application No. 14/278,850, filed on May 15, 2014, now Pat. No. 9,202,089.

(51) Int. Cl.
*G06K 7/00*      (2006.01)
*G06Q 20/32*    (2012.01)
*G06K 19/077*  (2006.01)

(52) U.S. Cl.
CPC ...... *G06Q 20/3278* (2013.01); *G06K 19/07732* (2013.01); *G06K 19/07741* (2013.01)

(58) Field of Classification Search
CPC ... G06F 15/173; G06F 21/10; G06F 21/6218; G06F 2221/07; G06K 19/04; G06K 19/0717; G06Q 30/0601; G06Q 30/0641; G06Q 10/08; G06Q 20/401; G06Q 30/0222; G06Q 20/32; G06Q 20/40
USPC ................. 235/440, 375, 380, 492, 486, 487
See application file for complete search history.

(56) References Cited

U.S. PATENT DOCUMENTS

| 7,575,481 | B1 | 8/2009 | Liu | |
| 2004/0039919 | A1* | 2/2004 | Takayama | G06Q 20/04 713/180 |
| 2005/0009564 | A1* | 1/2005 | Hayaashi | G06Q 20/12 455/558 |
| 2006/0083158 | A1 | 4/2006 | Lee | |
| 2007/0002807 | A1* | 1/2007 | Fletcher | H04W 84/14 370/338 |
| 2007/0265984 | A1* | 11/2007 | Santhana | G06Q 20/10 705/65 |

(Continued)

FOREIGN PATENT DOCUMENTS

| CA | 2893040 A1 | 6/2014 |
| JP | 3165776 U | 2/2011 |
| JP | 3194405 U | 11/2014 |

OTHER PUBLICATIONS

Anonymous: "RFC 1994—PPP Challenge Handshake Authentication Protocol (CHAP)", Aug. 31, 1996, XP 055213700, Retrieved from the Internet: URL:https://tools.ietf.org/html/rfc1994 [retrieved on Sep. 16, 2015].

(Continued)

*Primary Examiner* — Thien M Le
(74) *Attorney, Agent, or Firm* — SmithAmundsen LLC; Kelly J. Smith; Stephen L. Farris

(57) ABSTRACT

A mobile payment method to be implemented using an electronic device includes: receiving transaction information, establishing wireless short-range communication with a mobile device provided with a payment card, during the wireless short-range communication, transmitting the transaction information to the mobile device and receiving a payment command generated based on the transaction information from the mobile device, transmitting the payment command to a payment institution server, and receiving a payment result therefrom. The payment command enables the payment institution server to identify validity of the payment card and to process the payment. The payment result is generated after completing the payment.

12 Claims, 23 Drawing Sheets

(56) References Cited

U.S. PATENT DOCUMENTS

| | | | |
|---|---|---|---|
| 2007/0277044 A1 | 11/2007 | Graf et al. | |
| 2008/0026614 A1 | 1/2008 | Emerson et al. | |
| 2008/0125080 A1* | 5/2008 | Phillips | H04L 12/14 455/405 |
| 2008/0132201 A1* | 6/2008 | Karlberg | G06Q 20/227 455/407 |
| 2009/0061696 A1 | 3/2009 | Lin et al. | |
| 2009/0089496 A1 | 4/2009 | Huang | |
| 2009/0255991 A1 | 10/2009 | Liao et al. | |
| 2010/0044444 A1* | 2/2010 | Jain | G06K 7/10237 235/492 |
| 2010/0250687 A1* | 9/2010 | Smith | G06Q 20/10 709/206 |

OTHER PUBLICATIONS

"The Best Approach for NEC", Jan. 1, 2013, XP055213861, Retrieved from the Internet: URL: https://www.sdcard.org/developers/overview/ASSD/smartsd/smart-microsd-intro.pdf [retrieved on Sep. 16, 2015].

European Search Report, Oct. 1, 2015, App. No. EP15178696.9, Applicant: Yang, Chien-Kang.

European Search Report, Date: Jan. 22, 2015, Application No. 14171341.2, Applicant: Yang, Chien-Kang.

Search Report of TW Patent Application No. 104105399 filed Feb. 16, 2015; issued Dec. 28, 2015.

* cited by examiner

| Store API | | |
|---|---|---|
| Back | Meditation BOOK STORE | |

Second Step: Confirm Transaction Information by Consumer

| Store Number | 0809C00100 |
|---|---|
| Transaction Date | 2014/12/22 |
| Payment Number | P000007 |
| Transaction Amount | NT$500 |

Confirm

FIG.6

MOBILE PAYMENT METHOD AND MOBILE PAYMENT APPARATUS

CROSS-REFERENCE TO RELATED APPLICATION

This application is a continuation-in-part of U.S. patent application Ser. No. 14/278,850 filed on May 15, 2014 and claiming priority of Taiwanese Patent Application No. 102217086, filed on Sep. 11, 2013.

FIELD

The disclosure relates to a mobile payment method and a mobile payment apparatus, more particularly to a mobile payment method and a mobile payment apparatus using Near Field Communication to realize secure payment for a transaction.

BACKGROUND

Electronic money or plastic money, for example, a bank card, a credit card, a debit card, a smart card, etc., is related to the use of a computer system and a digital stored value system to achieve money storage and money transfers. Since a consumer may be alleviated from the necessity of bringing too much cash to make a purchase, and since a merchant is not required to check the amount of the cash to confirm a payment for the purchase, the efficiency and convenience of transaction may be promoted. Therefore, electronic money is highly accepted and widely used in present days.

However, a conventional contactless stored value smart card usually lacks the function of card authentication, or has insufficient card authentication measures. Once a fake card is used for a payment, the merchant can only bear the loss on his/her own.

Furthermore, when the conventional contactless stored value smart card is used to make purchases, the transaction record resulting from each purchase is usually stored at the end of the merchant without being transmitted immediately to a card issuer or a financial institution for proceeding with the payment settling process. Instead, a whole batch of the transaction records is only transmitted to the card issuer or the financial institution for the payment processes at the end of a business day, i.e., batch settlement. Since procedures of this batch settlement is not sufficiently timely, chances that transaction records of a merchant do not match purchase records of a smart card may increase, exposing the merchant to the risk of loss.

SUMMARY

Therefore, the object of the present disclosure is to provide a mobile payment method and a mobile payment apparatus that allow timely payment process and that ensure secure payment for a transaction.

In a first aspect of the present disclosure, the mobile payment method is to be implemented using an electronic device which is configured to interact with a mobile device that is provided with a payment card. The electronic device communicates with a payment institution server. The mobile payment method includes the steps of:

receiving transaction information related to a transaction and to a payment for the transaction;

establishing wireless short-range communication with the mobile device;

during the wireless short-range communication, transmitting the transaction information to the mobile device through the wireless short-range communication;

during the wireless short-range communication, receiving a payment command from the mobile device through the wireless short-range communication, the payment command being generated by the mobile device based on at least the transaction information;

establishing a session with the payment institution server, the session providing a secure communication channel between the electronic device and the payment institution server;

transmitting the payment command to the payment institution server under the session, the payment command enabling the payment institution server to identify validity of the payment card based on the payment command in response to receipt of the payment command and to process the payment according to the transaction information included in the payment command after identifying the payment card as valid; and receiving a payment result from the payment institution server under the session, the payment result being generated by the payment institution server after completing the payment.

In a second aspect of the present disclosure, the mobile payment method is to be implemented using a mobile device which is provided with a payment card and which is configured to interact with an electronic device. The mobile device and the electronic device communicate with a payment institution server. The mobile payment method includes the steps of:

establishing, by the mobile device, a wireless shot-range communication with the electronic device;

during the wireless short-range communication, receiving, by the mobile device, transaction information from the electronic device through the wireless short-range communication, the transaction information being related to a transaction and to a payment for the transaction;

during the wireless short-range communication, generating a payment command based on at least the transaction information, and transmitting the payment command thus generated to the electronic device through the wireless short-range communication, the payment command being provided by the electronic device to the payment institution server and enabling the payment institution server to identify validity of the payment card based on the payment command in response to receipt of the payment command and to process the payment according to the transaction information included in the payment command after identifying the payment card as valid; and receiving, by the mobile device, a payment result from the payment institution server, the payment result being generated by the payment institution server after completing the payment.

In a third aspect of the present disclosure, a mobile payment apparatus is configured to interact with an electronic device which communicates with a payment institution server. The mobile payment apparatus includes a mobile device which includes a processor, a memory unit, a card slot, a short-range communication unit and a communication unit. The memory unit is coupled to the processor and stores a payment application therein. The card slot is coupled to the processor, and is removably inserted with a payment card, thereby enabling access to the payment card using the mobile device. The short-range communication unit is coupled to the processor and is configured to communicate with the electronic device. The communication unit is coupled to the processor and is configured to communicate with the payment institution server. The payment application, when executed by the processor, causes the mobile payment apparatus to establish a wireless short-range communication with the electronic device, during the wireless short-range communication, receive transaction information from the electronic device through the wireless short-range communication, the transaction information being related to a transaction and to a payment for the transaction, during the wireless short-range communication, generate a payment command based on at least the transaction information, and transmit the payment command thus generated to the electronic device through the wireless short-range communication, the payment command being provided by the electronic device to the payment institution server and enabling the payment institution server to identify validity of the payment card based on the payment command in response to receipt of the payment command and to process the payment according to the transaction information included in the payment command after identifying the payment card as valid, and receive a payment result from the payment institution server, the payment result being generated by the payment institution server after completing the payment.

BRIEF DESCRIPTION OF THE DRAWINGS

Other features and advantages of the present disclosure will become apparent in the following detailed description of the embodiments with reference to the accompanying drawings, of which:

FIGS. 4 to 12 illustrate various messages outputted by an input/output (I/O) module of the electronic device and an I/O unit of the mobile device in different stages of the mobile payment method;

DETAILED DESCRIPTION

Figure 1:
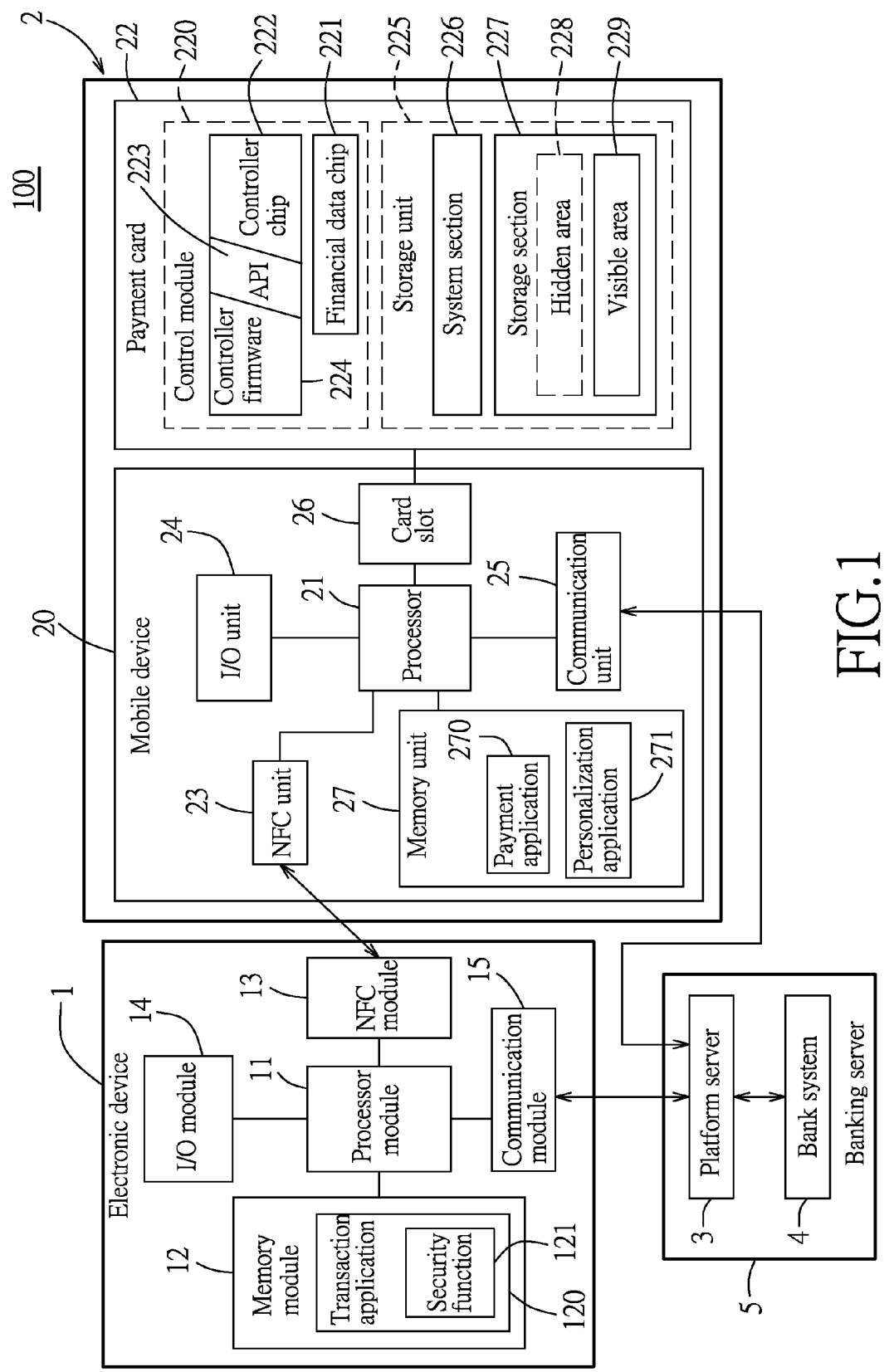
FIG. 1 is a block diagram of a system including an electronic device and an embodiment of a mobile payment apparatus according to the disclosure.

Referring to FIG. 1, an embodiment of a system 100 according to the present disclosure is adapted for implementing a mobile payment method, according to the present disclosure, that processes a payment related to a transaction. The system 100 includes an electronic device 1 which is possessed, for example, by a merchant, and a mobile payment apparatus 2 which is possessed, for example, by a consumer. The mobile payment apparatus 2 includes a mobile device 20 and a payment card 22 that is removably inserted into a card slot of the mobile device 20. The electronic device 1 is configured to interact with the mobile device 20 provided with the payment card 22. The electronic device 1 and the mobile device 20 are able to communicate with a payment institution server, which is referred to as a banking server 5 hereinafter.

Figure 2:
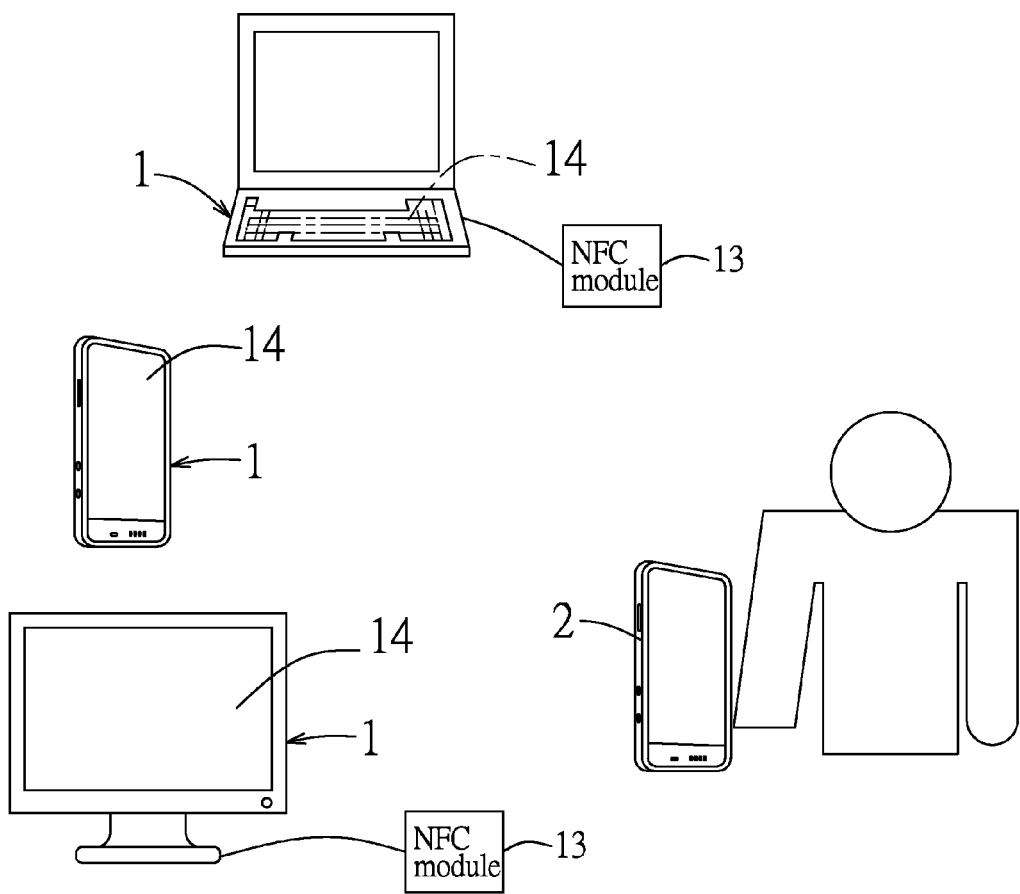
FIG. 2 is a schematic view of the mobile payment apparatus being configured to communicate with various electronic devices in the system of FIG. 1.

In this embodiment, the electronic device 1 may be one of a personal computer, a laptop computer, a mobile electronic device (see FIG. 2), etc. The electronic device 1 is required to include network connectivity and mechanism for executing a transaction application 120 designed for causing the electronic device 1 to perform the mobile payment method of the present disclosure.

The banking server 5 may be operated by a bank that issues payment cards to customers. In this embodiment, the banking server 5 includes a platform server 3 for communicating with the electronic device 1 and the mobile device 20, and a bank system 4 that is coupled to the platform server 3. In various embodiments, the platform server 3 and the bank system 4 may be integrated as a single component (e.g., a server) or may be implemented as two separate components that communicate over a dedicated channel or session. Incases that the platform server 3 and the bank system 4 are implemented as separate components, the platform server 3 may be operated by a third party other then the bank.

The electronic device 1 is provided with a Near Field Communication (NFC) module 13, and includes a memory module 12 that stores the transaction application 120 therein, an input/output (I/O) module 14, a communication module 15, and a processor module 11 to which the aforementioned modules 12 to 15 are coupled.

In this embodiment, the electronic device 1 provided with the NFC module 13 is supportable of NFC communication functionalities, and the NFC module 13 is an external device, such as a Universal Serial Bus (USB) NFC dongle or a USB NFC reader, to be connected removably to a body of the electronic device 1. Alternatively, the NFC module 13 may be a built-in module embedded in the electronic device 1. The I/O module 14 may include, but is not limited to, a mouse/keyboard combination, a touch screen, a speaker/display combination, or any combination thereof. The communication module 15 enables the communication between the electronic device 1 and the banking server 5.

The mobile payment apparatus 2 is configured to interact with the electronic device 1. The mobile device 20 of the mobile payment apparatus 2 is, for example, a smart phone, a tablet computer, etc. The mobile device 20 includes a memory unit 27 that stores a payment application 270 and a personalization application 271 therein, a card slot 26 that is removably inserted with the payment card 22, thereby enabling access to the payment card 22 using the mobile device 20, a short-range communication unit, such as an NFC unit 23, that is configured to communicate with the electronic device 1, an I/O unit 24, a communication unit 25 that is configured to communicate with the banking server 5, and a processor 21 to which the aforementioned units 23 to 26 are coupled. Alternatively, the payment card 22 may be coupled to an interface device which is to be coupled to the mobile device 20 via an USB interface thereof so as to enable the mobile device 20 to access the payment card 22 through the interface device.

In this embodiment, the NFC unit 23 is supportable of NFC communication functionalities. The I/O unit 24 may include, but is not limited to, a mouse/keyboard combination, a touch screen, a speaker/display combination, or any combination thereof. The processor of the mobile device 20 executes the payment application 270 stored in the memory unit 27 and designed for causing the mobile device 20 to cooperate with the payment card 22 to perform the mobile payment method of the present disclosure.

The electronic device 1 and the mobile device 20 are able to establish wireless short-range communication, e.g., NFC communication, therebetween via the NFC module 13 and the NFC unit 23, respectively, when the electronic device 1 and the mobile device 20 are brought into proximity of each other for conducting an NFC payment.

In this embodiment, the payment card 22 is embodied using a micro Secure Digital (SD) card. The payment card 22 includes a control module 220, a financial data chip 221 and a storage unit 225. The financial data chip 221 complies with the FISC II specification.

The control module 220 includes a controller chip 222, controller firmware 224 that is loaded in a read-only memory (ROM) (not shown in the drawings), and an application program interface (API) 223. The controller chip 222 and the ROM may be integrated using integrated circuit packaging, and may be juxtaposed with the storage unit 225.

When the payment card 22 is inserted into the card slot 26, the processor 21 is operable to access the financial data chip 221 and the storage unit 225 through the controller firmware 224. The API 223 and the controller firmware 224 are able to operate according to the instructions of the payment application 270 and the personalization application 271. The API 223 includes functions that are able to perform encryptions using algorithms such as Triple Data Encryption Algorithm symmetric-key block cipher (3DES), Advanced Encryption Standard (AES), RSA encryption, etc.

The storage unit 225 includes a system section 226 and a storage section 227. The system section 226 is built in with basic operation information. The storage section 227 includes a hidden area 228 and a visible area 229. The visible area 229 allows access thereto by an operating system (OS) of the mobile device 20. For example, for an Android® system, the visible area 229 may be accessed using a file management program.

The hidden area 228 is not accessible by the OS, and it is not allowed to perform operations such as reading, writing or modifying content of files stored in the hidden area 228, via the OS. Instead, the hidden area 228 is only accessible by the payment application 270 and the personalization application 271 via the controller firmware 224 after a certain authorization sequence has been done. Specifically, when the payment card 22 is inserted into the card slot 26 of the mobile device 20, the controller firmware 224 is configured to report to the OS that only the visible area 229 is detected. As a result, the OS will not display the hidden area 228 to a user. The hidden area 228 is accessible only when the user executes the payment application 270 and the personalization application 271, and passes the authorization sequence. Since details regarding the authorization sequence may be readily appreciated by those skilled in the art, they will not be discussed herein for the sake of brevity.

The hidden area 228 stores a virtual account associated with a bank account that is between an owner of the payment card 22 and the bank which operates the banking server 5. Data regarding the bank account is stored in the financial data chip 221. In practice, the hidden area 228 may store a plurality of virtual accounts respectively associated with a plurality of bank accounts.

In cases where the mobile device 20 is not provided with the NFC unit 23, i.e., the mobile device 20 alone is not provided with an NFC capability, the payment card 20 may be configured to include the NFC capability. Specifically, in a variation of this embodiment, the payment card 20 includes a plurality of NFC pins, and is incorporated with an NFC antenna, and may be embodied as an SDIO (Secure Digital Input Output) card that supports NFC communication functionalities.

Accordingly, in the variation of this embodiment, the card slot 26 includes a plurality of NFC terminals. The NFC terminals 612 conform with the NFC specifications ("SD Specifications Part 1 NFC Interface Simplified Addendum" issued by the SD Card Association). The NFC terminals are spaced apart from one another, and are electrically and respectively connected to the NFC pins of the payment card 22 when the payment card 20 is inserted into the card slot 26. As a result, the payment card 22 is capable of interacting with the mobile device 20 so as to enable the mobile device 20 to support NFC communication functionalities.

Figure 3A:
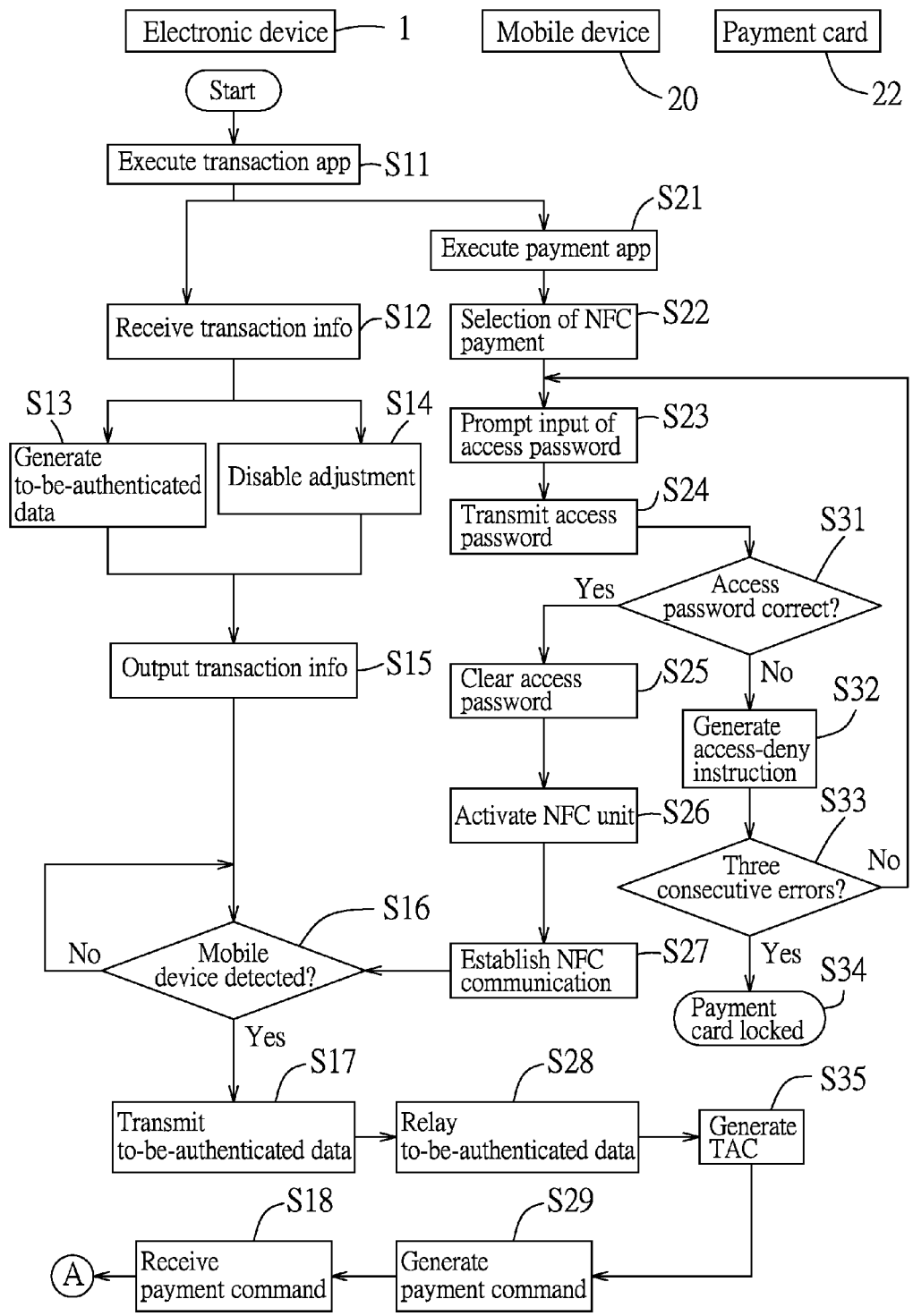
FIGS. 3A to 3C cooperatively illustrate a flowchart illustrating an embodiment of a mobile payment method according to the present disclosure.

Further referring to FIG. 3A, an embodiment of the mobile payment method for processing a payment for a transaction will now be described. In the following example, the electronic device 1 may be embodied using a computer, the mobile device 20 may be a smart phone inserted with the payment card 22, and the transaction is associated with purchase of a book from a book store.

Figure 4:
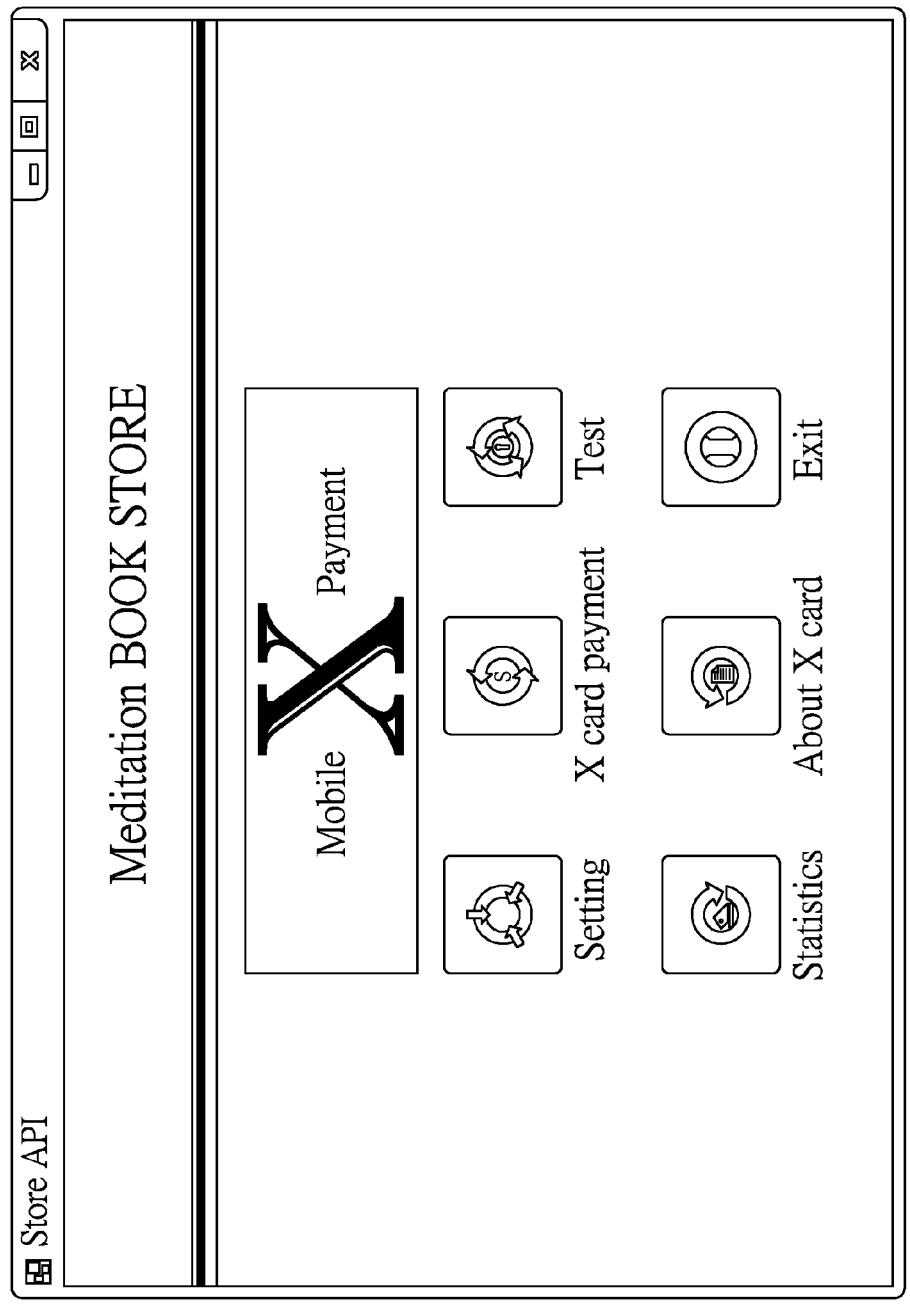

To begin with, a merchant staff at the book store initiates execution of the transaction application 120 using the electronic device 1 (see FIG. 4).

In step S11, the processor module 11 of the electronic device 1 executes the transaction application 120 stored in the memory module 12.

Figure 5:
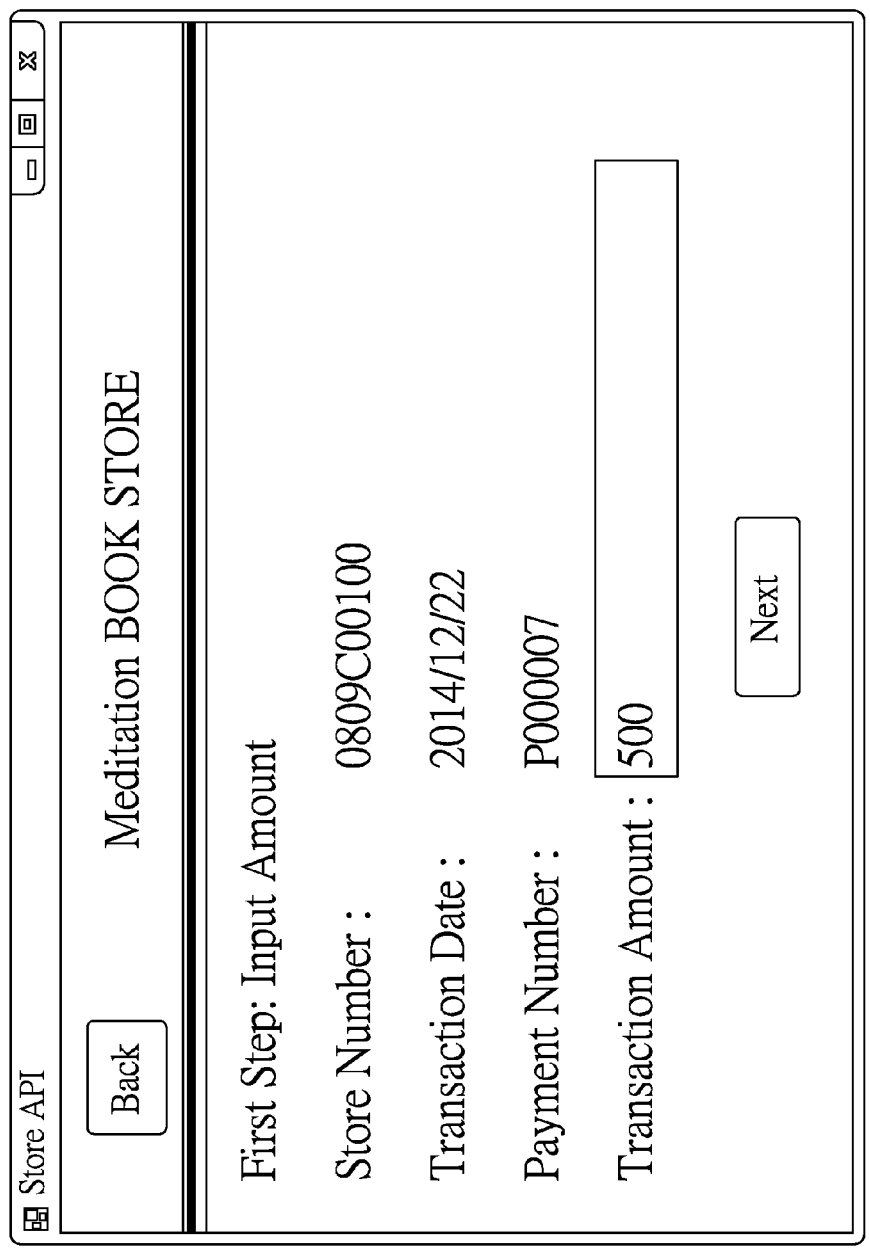

The transaction application 120 provides the merchant staff with an interface (see FIG. 5) for inputting transaction information related to the transaction and to the payment for the transaction. Here, the transaction information includes details regarding the purchase of the book (e.g., information related to the store number (e.g., identification number of the book store), transaction date, payment number, transaction amount, etc.)

In step S12, the processor module 11 receives the transaction information related to the transaction and to the payment for the transaction. For example, the transaction information may be inputted to the electronic device 1 by scanning a barcode associated with the goods and/or services. Alternatively, the transaction information may be inputted by the merchant staff using the electronic device 1.

In step S13, the processor module 11 executes a security function 121 included in the transaction application 120 to generate to-be-authenticated data.

In step S14, the processor module 11 disables alterations to be made to the transaction information.

Specifically, the to-be-authenticated data includes the transaction information, and after step S14, it is not allowed for the merchant to make any change to the transaction information. It should be noted that steps S13 and S14 may be performed in any order, or performed simultaneously.

In step S15, the processor module 11 outputs, via the I/O module 14, the transaction information (see FIG. 6) for confirmation by the consumer who wishes to purchase the book.

Figure 7:
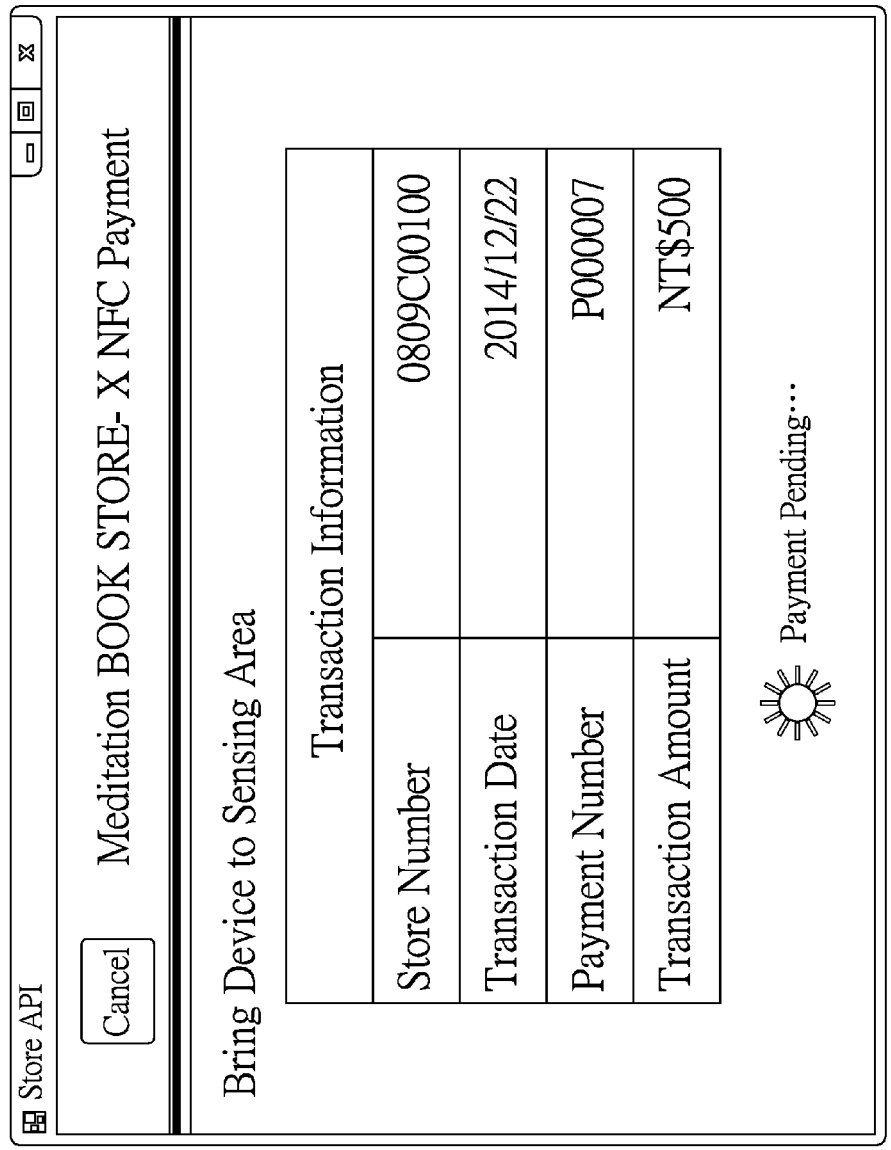

In step S16, the processor module 11 generates an instruction (see FIG. 7) to prompt the consumer to bring the mobile device 20 inserted with the payment card 22 to the proximity of a payment sensing area, i.e., the NFC module 13, of the electronic device 1. When the processor module 11 detects the presence of the mobile device 20 via the NFC module 13, the processor module 11 establishes wireless short-range communication with the mobile device 20 via the NFC module 13, and the flow proceeds to step S17. Otherwise, the processor module 11 idles until the presence of the mobile device 20 is detected. Specifically, the processor module 11 automatically establishes NFC communication with the mobile device 20 as the wireless short-range communication when the electronic device 1 and the mobile device 20 are brought into proximity of each other.

Figure 8:
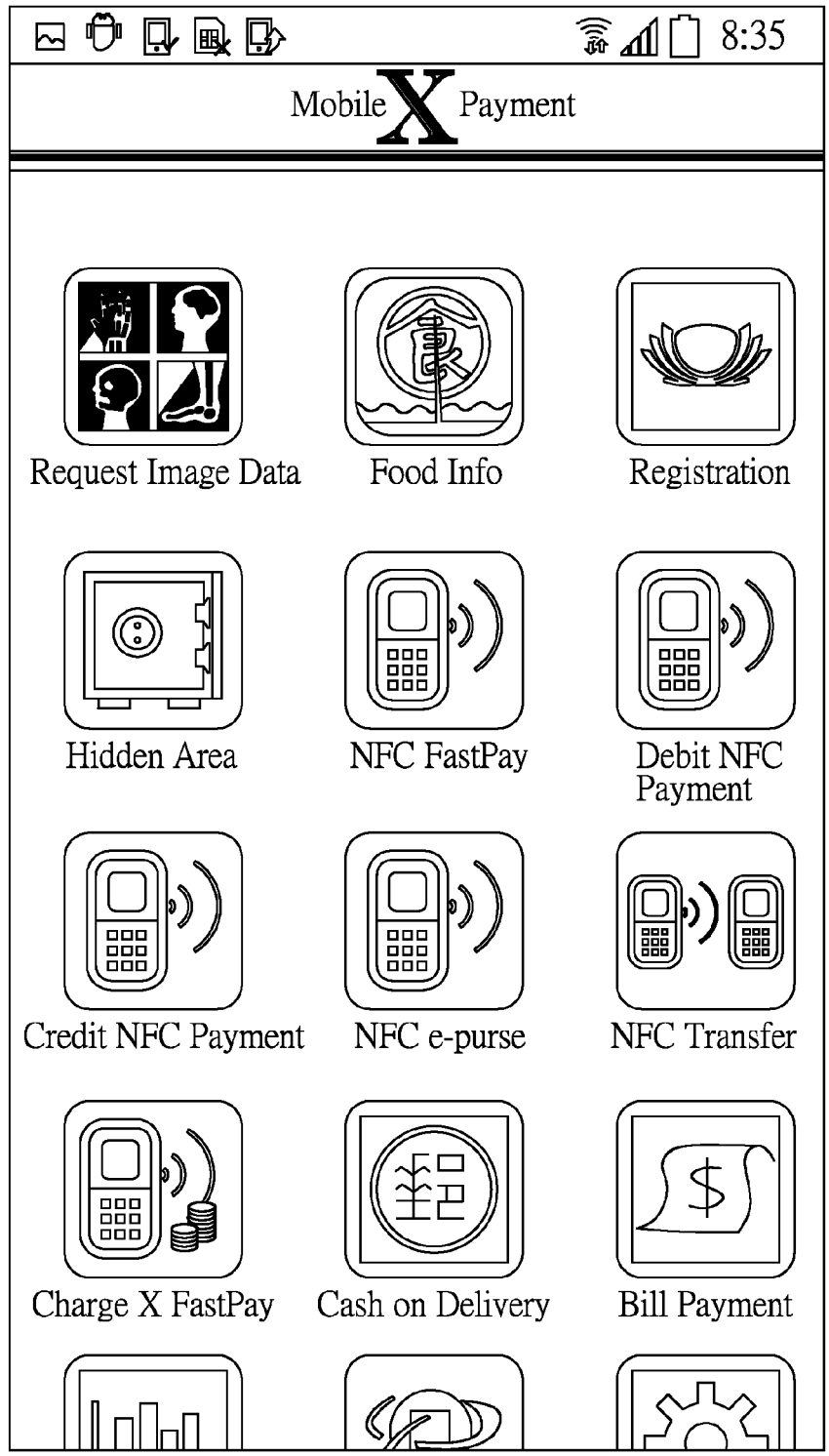

On the other hand, when the consumer intends to conduct the payment for the purchase of the book using the mobile payment apparatus 2, i.e., the mobile device 20 in combination with the payment card 22, the consumer executes the payment application 270 using the mobile device 20 (see FIG. 8).

Therefore, in step S21, the processor 21 of the mobile device 20 executes the payment application 270 stored in the memory unit 27.

The payment application 270 provides a number of ways for the user to make the payment (e.g., NFC payment or cash on delivery). Here, in this case, the user selects NFC payment to make the payment through NFC technology.

In step S22, the processor 21 is instructed of the selection of NFC payment by the consumer.

Figure 9:
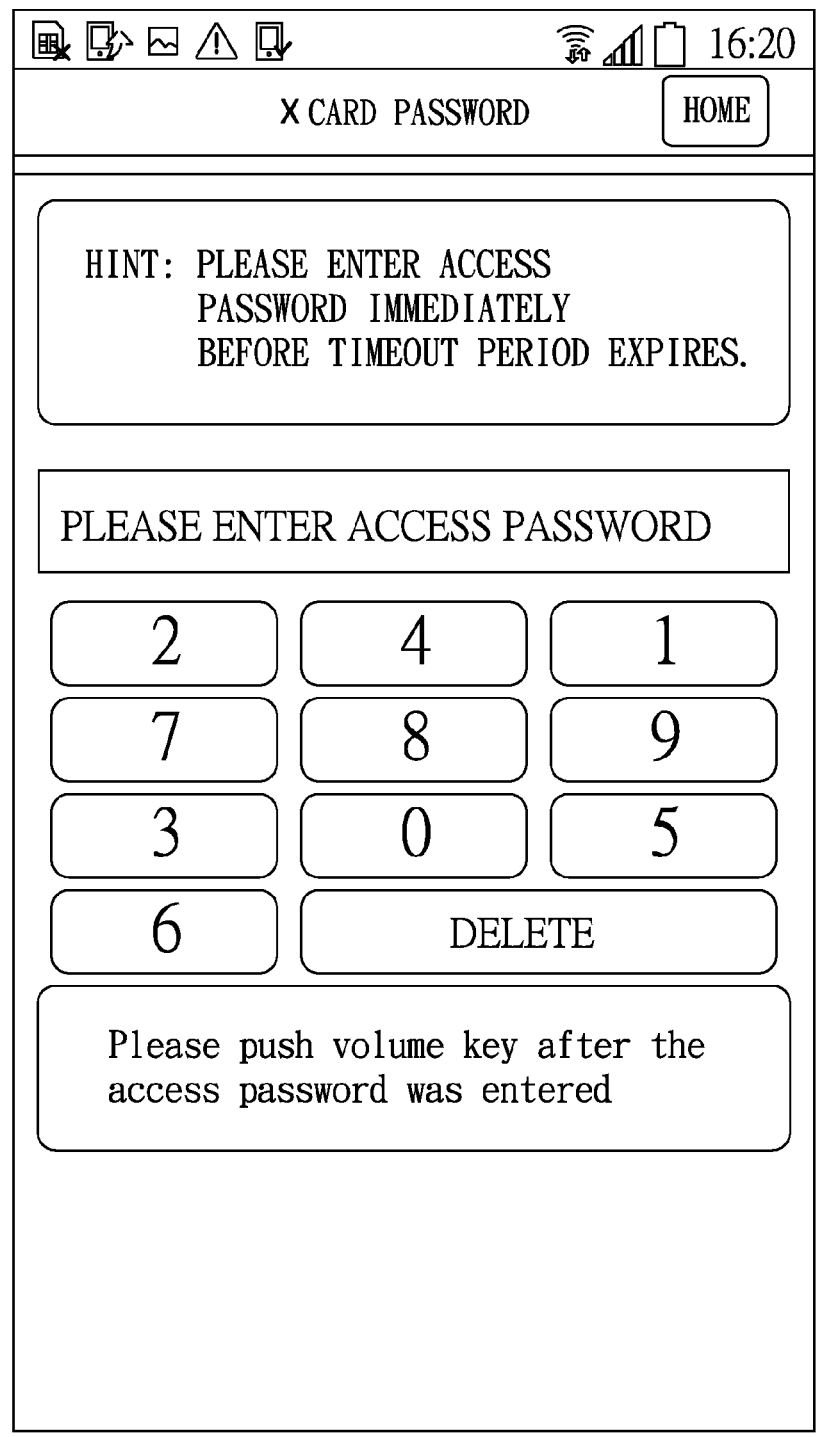

In step S23, the processor 21 outputs an instruction that prompts user input of an access password associated with the payment card 22 (see FIG. 9).

In step S24, upon receipt of the access password, the processor 21 subsequently transmits the access password to the payment card 22 via the card slot 26.

In step S31, the payment card 22 verifies the access password. When it is verified by the payment card 22 that the access password is correct, the payment card 22 transmits an access-grant instruction to the mobile device 20, and the flow proceeds to step S25. Otherwise, the flow proceeds to step S32.

In step S32, the payment card 22 transmits an access-deny instruction to the mobile device 20, so that the mobile device 20 notifies that the access password is incorrect via the I/O unit 24. The payment card 22 counts a number of consecutive occasions that an incorrect access password is received.

In step S33, the payment card 22 determines whether the number thus counted is equal to or greater than a threshold, for example, three. When the number thus counted is neither equal to nor greater than the threshold, the flow goes back to step S23 for allowing the consumer to enter another access password. Otherwise, the flow proceeds to step S34.

In step S34, the payment card 22 is locked and access to the payment card 22 is prohibited.

In step S25, the processor 21 of the mobile device 20 clears the access password that is received in step S24 and that is temporarily stored therein. This step is implemented to prevent the access password from being retrieved by other parties.

It is noted that, in a scenario that an electronic purse is utilized for small payments, payment convenience becomes the primary concern. In this way, the steps of S23 to S25 and S31 to S34 may be omitted so as to achieve faster payment.

In step S26, the processor 21 of the mobile device 20 activates the NFC unit 23 to initiate the NFC communication functionalities.

Figure 10:
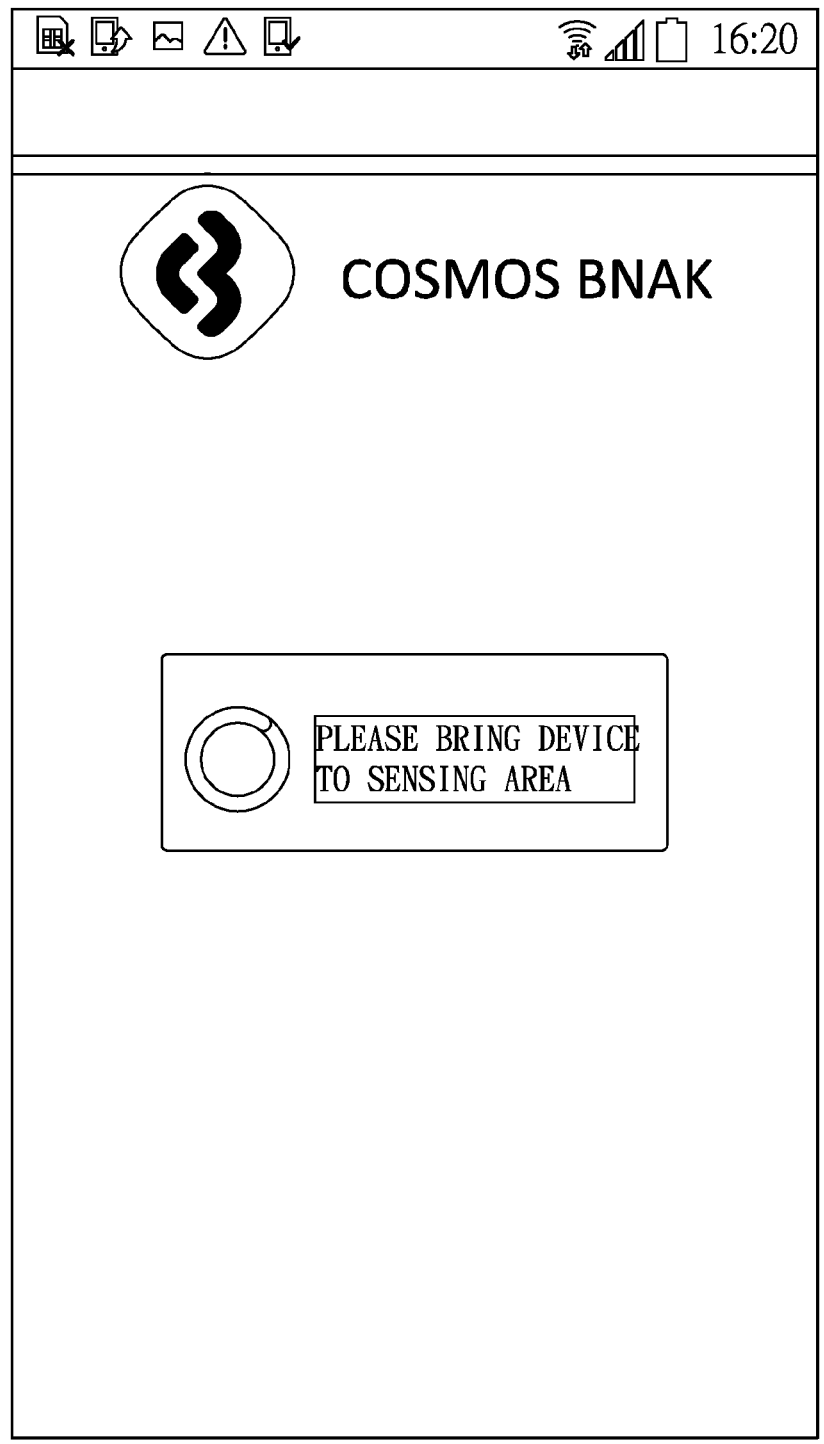

Subsequently, the consumer is prompted by the mobile device 20 to bring the mobile device 20 into proximity of the payment sensing area (i.e., the NFC module 13) of the electronic device 1 (see FIG. 10).

Afterward, in step S27, the processor 21 of the mobile device 20 automatically establishes the wireless short-range communication, i.e., the NFC communication, with the electronic device 1 via the NFC unit 23 when the mobile device 20 is brought into proximity of the electronic device 1.

In step S17, after the NFC communication has been established between the electronic device 1 and the mobile device 20 in step S27 (i.e., the mobile device 20 is detected by the electronic device 1 in step S16), during the NFC communication, the processor module 11 of the electronic device 1 transmits the to-be-authenticated data to the mobile device 20 through the NFC communication.

In step S28, during the NFC communication, the processor 21 of the mobile device 20 relays the to-be-authenticated data to the payment card 22.

In step S35, during the NFC communication, the payment card 22 generates a transaction authentication code (TAC) based on the to-be-authenticated data using a secret key stored in the payment card 22, and transmits the TAC to the mobile device 20.

Specifically, the payment card 22 stores, in one of the financial data chip 221 and the hidden area 228, a secret key corresponding to the virtual account which the consumer intends to use for payment. As such, the payment card 22 retrieves the secret key based on the virtual account for generating the TAC. It is noted that the banking system 4 of the banking server 5 is provided with the same secret key corresponding the virtual account for identifying validity of the payment card 22.

In step S29, during the NFC communication, the processor 21 of the mobile device 20 executing the payment application 270 composes a payment command using the TAC. The payment command includes at least the virtual account, the transaction information and the TAC, and is encrypted. The mobile device 20 subsequently transmits the payment command to the electronic device 1 through the NFC communication.

In step S18, during the NFC communication, the processor module 11 of the electronic device 1 receives the payment command from the mobile device 20 through the NFC communication.

It is noted that the aforementioned steps S17, S28, S35, S29 and S18 are performed during the NFC communication, and after these steps have been completed, an indication may be made by at least one of the electronic device 1 and the mobile device 20 to notify the consumer to remove the mobile device 20 from the proximity of the electronic device 1 so as to terminate the NFC communication.

Figure 3B:
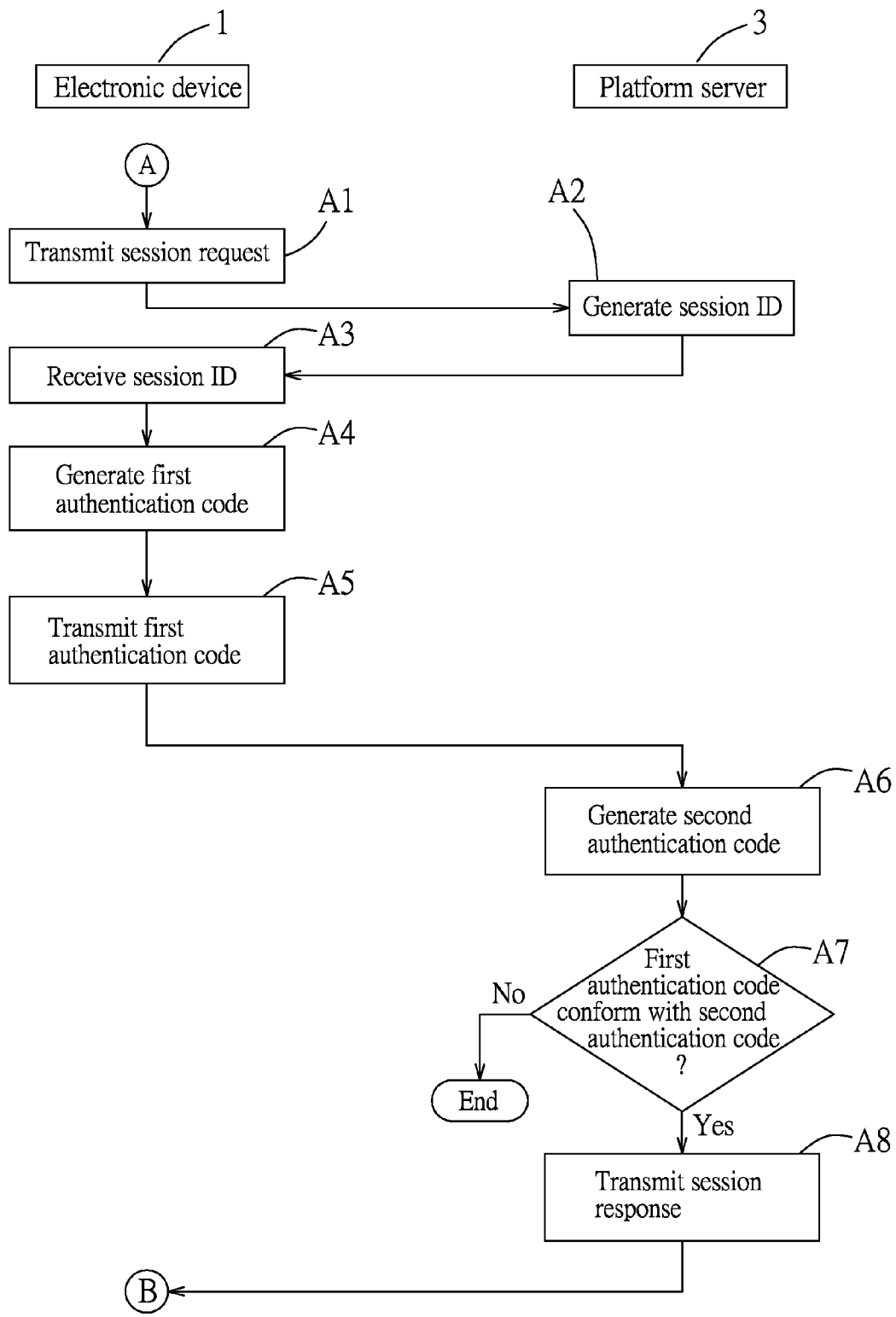

Referring to FIG. 3B, after step S18, the electronic device 1 attempts to establish a session with the platform server 3 of the banking server 5. The session is for providing a secure communication channel between the electronic device 1 and the platform server 3, and for identifying validity of the electronic device 1.

In step A1, the processor module 11 of the electronic device 1 executing the transaction application 120 transmits a session request to the platform server 3.

In step A2, the platform server 3 generates a session identification (ID) in response to receipt of the session request, and transmits the session ID to the electronic device 1.

In step A3, the processor module 11 of the electronic device 1 receives the session ID.

In step A4, the processor module 11 generates a first authentication code based on the session ID thus received and a first identification key that is pre-stored in advance in the electronic device 1.

In step A5, the processor module 11 transmits the first authentication code to the platform server 3.

In step A6, the platform server 3, based on the electronic device 1 from which the first authentication code is transmitted, finds a second identification key which is pre-stored in the banking server 5, which corresponds to the first identification key of the electronic device 1, and which is dedicated to the electronic device 1. The platform server 3 subsequently generates a second authentication code based on the session ID, which is generated in response to receipt of the session request in step A2, and the second identification key thus found.

In step A7, the platform server 3 determine whether the first authentication code received from the electronic device 1 in step A5 conforms with the second authentication code generated in step A6. When it is determined that the first authentication code conforms with the second authentication code, the flow proceeds to step A8. Otherwise, the platform server 3 determines that the electronic device 1 failed to generate a valid first authentication code, and the flow is terminated.

In step A8, the platform server 3 transmits a session response to the electronic device 1 so as to establish the session and to allow the transaction to proceed.

Figure 3C:
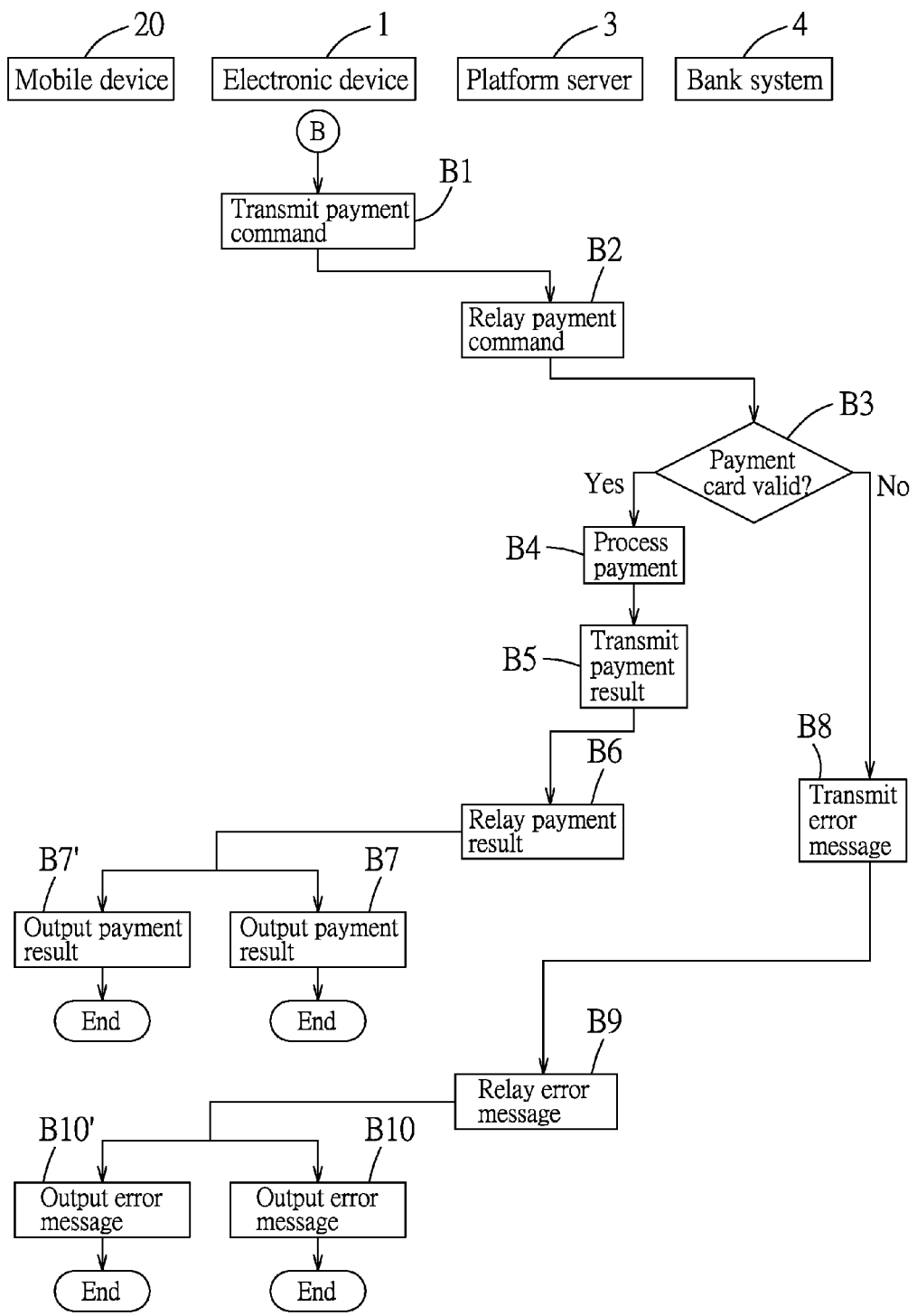

Referring to FIG. 3C, after the platform server 3 allows the transaction to proceed, in step B1, the processor module 11 of the electronic device 1 transmits the payment command received in step S18, via the communication module 15, to the platform server 3 under the session. Specifically, the transmission is executed using Secured Sockets Layer (SSL) protocol.

In step B2, the platform server 3 in turn transmits the payment command to the bank system 4 through the dedicated channel.

In step B3, in response to receipt of the payment command, the bank system 4 decrypts the received payment command, and identifies validity of the payment card 22 based on the payment command. Specifically, the bank system 4 generates a confirmation code based on the to-be-authenticated data included in the payment command using the same secret key stored in the payment card 22 (e.g., in the financial data chip 221 or the hidden area 228). In some embodiments, the secret key for generating the confirmation code may be included in the payment command, and transmitted by the platform server 3 to the bank system 4.

The bank system 4 then compares the TAC and the confirmation code. When it is determined that the confirmation code conforms with the TAC, the bank system 4 determines that the payment card 22 is valid, and that the transaction information was not altered during transmission. The flow then proceeds to step B4. Otherwise, the flow proceeds to step B8.

In step B4, the bank system 4 is configured to process the payment according to the transaction information included in the payment command. In this case, a value of the book (in this case, NT$500) is deducted from the bank account that is represented by the virtual account included in the payment command, and is transferred to an account owned by the book store.

Then, in step B5, the bank system 4 generates a payment result indicating that the payment has been processed, and transmits the payment result to the platform server 3.

In turn, in step B6, the platform server 3 relays the payment result to the electronic device 1. The transmission of the payment result to the electronic device 1 is similarly under the session and uses the SSL protocol. Moreover, the platform server 3 further relays the payment result to the mobile device 20.

Figure 11:
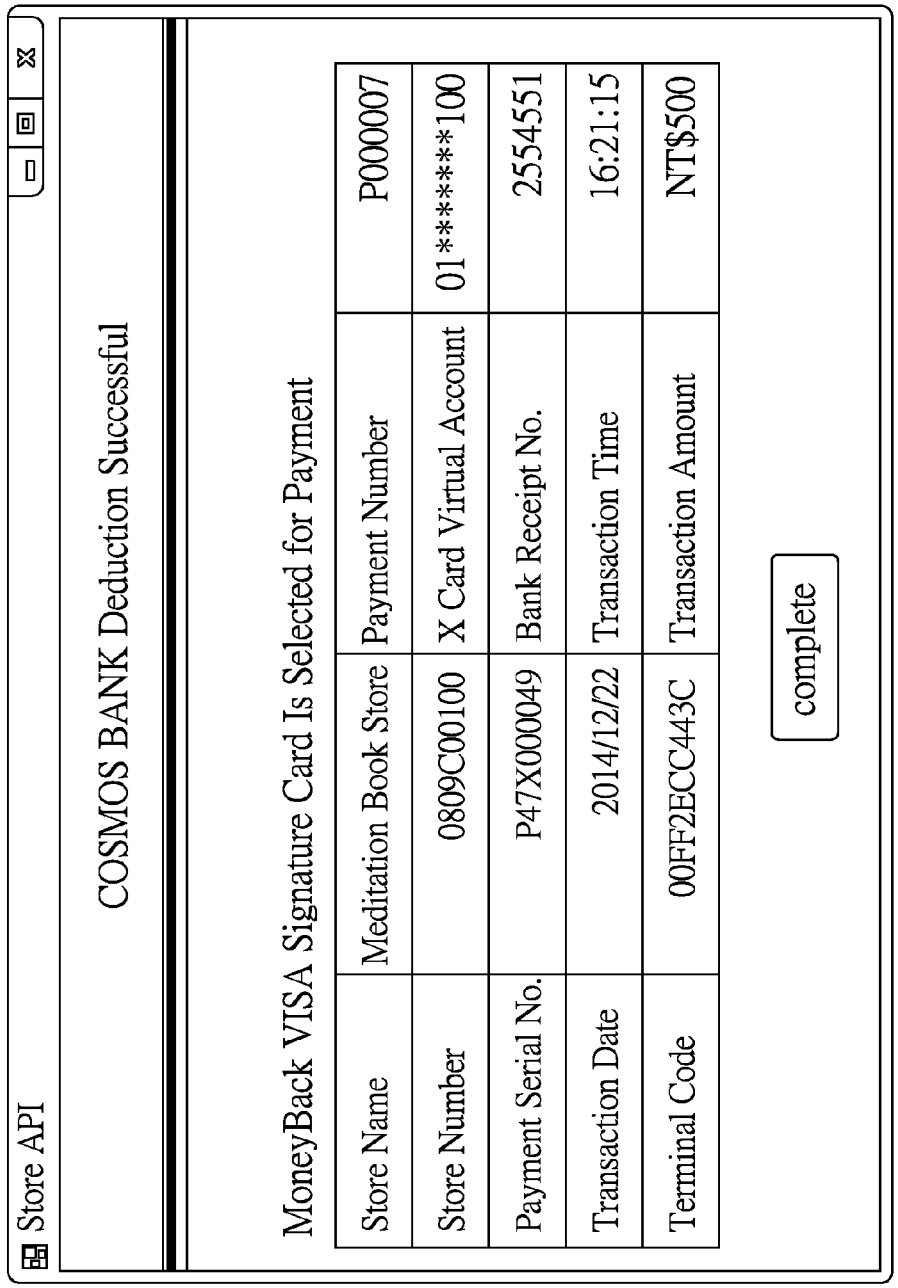

Afterward, in step B7, in response to receipt of the payment result, the processor module 11 of the electronic device 1 outputs, via the I/O module 14, the payment result (see FIG. 11) to notify the merchant staff a result of the payment. In this way, the payment is processed, and the customer may obtain the goods/services, e.g., the book from the merchant staff.

Figure 12:
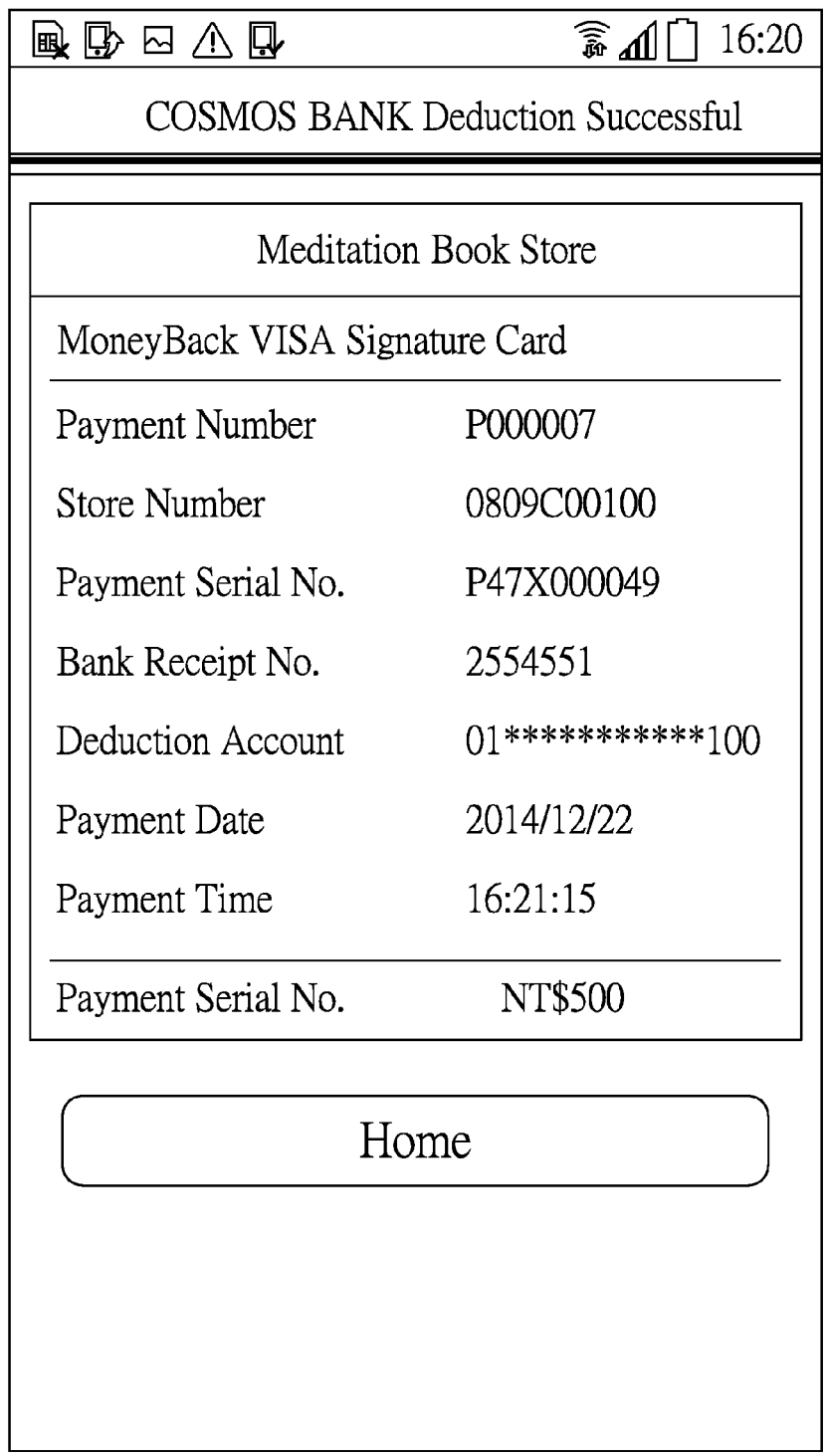

Similarly, in step B7', in response to receipt of the payment result, the processor 21 of the mobile device 20 outputs, via the I/O unit 24, the payment result (see FIG. 12) to notify the consumer the result of the payment.

In step B3, when it is determined that the confirmation code does not conform with the TAC, the bank system 4 determines that either the payment card 22 is invalid, or the transaction information was altered during transmission. As a result, in step B8, the bank system 4 generates and transmits an error message to the platform server 3.

In step B9, the platform server 3 relays the error message to the electronic device 1, which outputs the error message in step B10.

Similarly, in step B9, the platform server 3 also relays the error message to the mobile device 20, which outputs the error message in step B10'. As a result, the transaction will not be processed.

In one example, the mobile payment method is applicable in cases where the goods/services are provided to the customer via delivery, and the payment is made after the goods/services have been delivered, i.e., cash on delivery. A delivery personnel may bring along an electronic device 1 installed with the transaction application 120, and after the customer confirms the goods/services, operate the electronic device 1 to perform the mobile payment method. As a result, the delivery personnel is not required to bring cash during the trip.

The mobile payment method is also applicable in cases where the goods/services are provided to the customer by a vending machine. After the payment is carried out in step B7, the vending machine provides the goods.

Further, the mobile payment method of the present disclosure may be applicable to money transfer using two smart phones. For example, a remittee operates a first smart phone to execute the transaction application 120 to cause the first smart phone to perform the aforementioned steps associated with the electronic device 1, and a remitter operates a second smart phone inserted with a payment card to execute the payment application 270 to cause the second smart phone to performed the aforementioned steps associated with the mobile device 20 and the payment card 22, so as to achieve money transfer using two smart phones by simply contacting them together or bringing them into proximity of each other.

In some embodiments, the payment card 22 may be configured to store additional data (e.g., medical and health information, license or identification information, membership, etc.) in the storage unit 225 of the payment card 22 which is coupled to the mobile device 20. The additional data may be stored in the storage unit 225 by the mobile device 20 executing the personalization application 271, which is further enabled to perform a personalization process (referred to as a "perso process").

It is assumed that in the perso process, the data that is to be stored in the payment card 22 needs to be handled using various security levels (for example, account information of a bank may require a higher security level than other general information). Accordingly, the payment card 22 of the present disclosure is further configured to provide more secure and adaptive data management.

In some embodiments, the hidden area 228 of the payment card 22 may be partitioned into a plurality of hidden data blocks. Each of the hidden data blocks is associated with a storage security level and is configured for storing a predetermined data type of personalization data. Accordingly, for each of the hidden data blocks, the controller chip 222 is configured to perform the perso process for storing the personalization data with a predetermined one of a plurality of securing mechanisms that corresponds to the storage security level.

Figure 13:
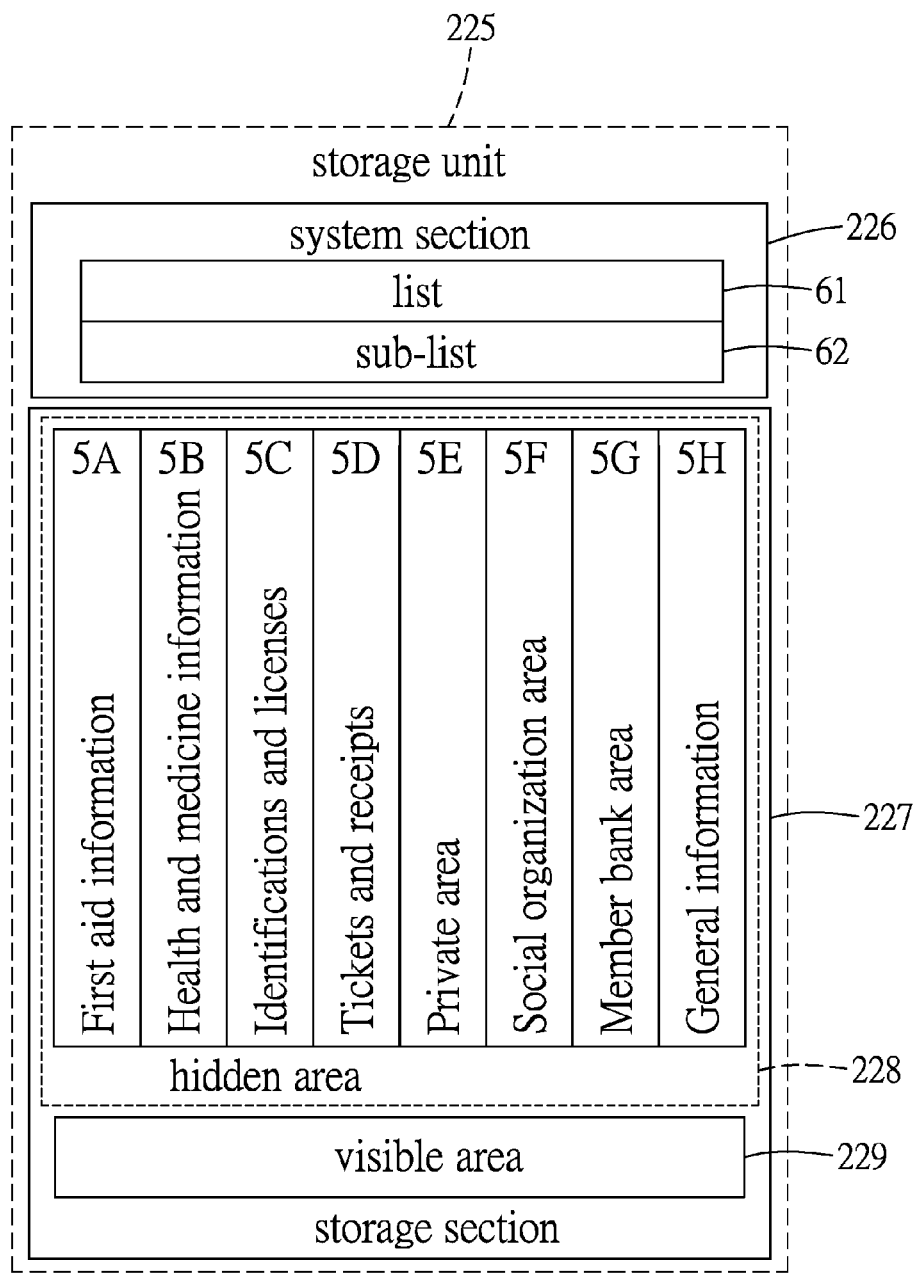
FIG. 13 is a block diagram of a storage unit of a payment card according to the disclosure.

In the example shown in FIG. 13, the hidden area 228 of the payment card 22 (see FIG. 1) is partitioned into eight hidden data blocks (5A-5H). Specifically, the hidden data block (5A) is for storing first aid information regarding a user of the payment card 22, such as emergency contact(s) of the user, major disease history, allergies to medication, etc.

The hidden data block (5B) is for storing basic health and medicine information regarding the user, such as physical examination and blood test result, electronic medical record (EMR) of the user, etc.

The hidden data block (5C) is for storing electronic identity documents and licenses held by the user and/or relatives, such as an identity card, passport, driver's license, etc.

The hidden data block (5D) is for storing electronic tickets and receipts, such as a prepaid train ticket or ticket for events and electronic invoices. The hidden data block (5E) is for storing the user's private data.

The hidden data block (5F) is for storing the user's registration data in various social organizations. The hidden data block (5G) is for storing the user's account information in various banks. The hidden data block (5H) is for storing other information.

For example, four different securing mechanisms are provided to implement the perso process for different storage security levels. Moreover, a party may have clearance to access some of the hidden data blocks based on the respective storage security levels.

In different securing mechanisms, the payment card 22 may be required to establish communications with various third parties, such as an authorized organization server 32, for obtaining authorization for implementing the perso process.

Specifically, in each of the securing mechanisms, the payment card 22 is required to communicate with the platform server 3, which stores at least parts of authorization information for authorizing the perso process, and/or the personalization data.

In some of the securing mechanisms, the payment card 22 is further required to communicate with other third parties, such as the authorized organization server 32 (see FIG. 16), a cooperating organization server 33 (see FIG. 33), or the bank system 4, for obtaining other parts of the authorization information.

For example, with respect to a first securing mechanism (platform perso mechanism), the platform server 3 stores at least a registration authorizing ID/password combination and a format authorizing ID/password combination. With respect to a second securing mechanism (authorized organization perso mechanism), the platform server 3 stores the registration authorizing ID/password combination, and the authorized organization server 32 stores the format authorizing ID/password combination. With respect to a third securing mechanism (cooperating organization perso mechanism), the platform server 3 stores the registration authorizing ID/password combination, and a third party (e.g., a bank server 4) stores the format authorizing ID/password combination. The cooperating organization server 33 and the platform server 3 cooperate to generate a format authorizing password in the format authorizing ID/password combination, which is subsequently stored in the third party. With respect to a fourth securing mechanism (user perso mechanism), the registration authorizing ID/password combination and the format authorizing ID/password combination are stored in the platform server 3, and the personalization data are inputted by the user.

The authorized organization server 32 may be operated by a third party that is authorized by the platform server 3 to provide information related to the perso process. The cooperating organization server 33 may be operated by a third party that cooperates with the platform server 3 to generate the information related to the perso process.

In some of the securing mechanisms, user-input of the personalization data is allowed (i.e., the personalization data may be received from the personalization application 271 via the controller firmware 224 and the API 223), while in other securing mechanisms, the personalization data is received from the third party and cannot be modified by the user.

For example, in the example shown in FIG. 13, for the hidden data block (5A), the personalization data may be inputted/modified by the user, and access thereto may be allowed to everyone. For the hidden data blocks (5C-5E), the personalization data may be inputted/modified by the user, and is only accessible by the user. For the hidden data blocks (5B, 5F and 5G), the personalization data is received from the third party (i.e., the user may not modify the data), and is only accessible by the user. For the hidden data block (5H), the personalization data is received from the third party, and access thereto may be allowed to everyone.

In this embodiment, each of the hidden data blocks (5A-5H) is further partitioned into a plurality of hidden data sub-blocks for storing the personalization data (for example, each of the hidden data sub-blocks under the hidden data block (5G) stores registered data and account information of one particular bank). It is noted that all hidden data sub-blocks under a particular hidden data block are associated with an identical security level, and employ an identical securing mechanism.

It is noted that in other embodiments, additional hidden data blocks may be further partitioned, and the existing hidden data blocks may be used for storing various other information. Additional securing mechanisms may be provided as well.

In use, the system section 226 of the payment card 22 may maintain a list 61 of the hidden data blocks, and a sub-list 62 of the hidden data sub-blocks under each of the hidden data blocks (5A-5H). For each of the hidden data sub-blocks, a specific perso process is implemented to store the personalization data into the hidden data sub-block.

Figure 14:
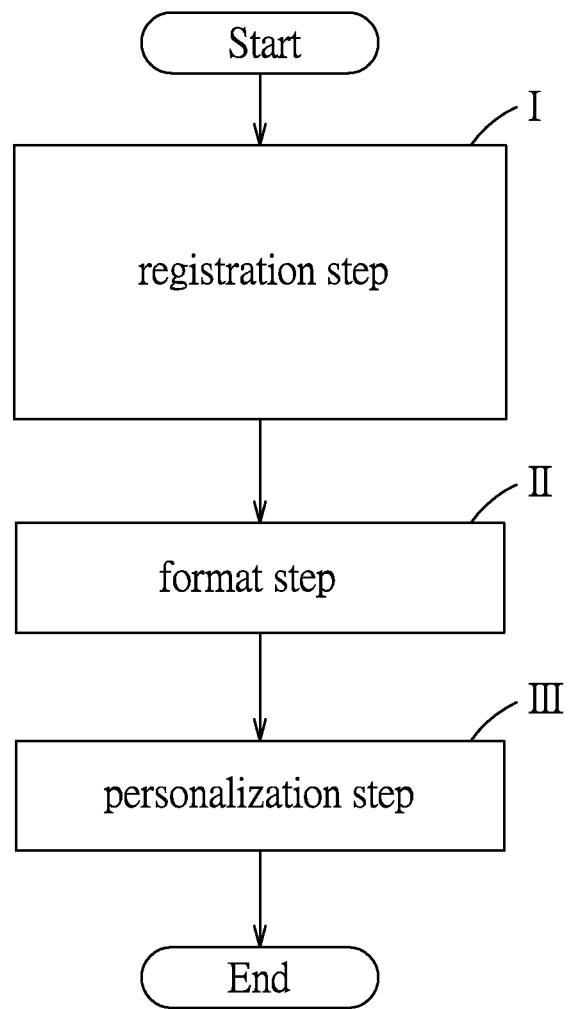
FIG. 14 is a flow chart of a personalization process for the payment card according to the disclosure.

Referring to FIGS. 1, 13 and 14, the perso process includes a registration step (I), a format step (II) and a personalization step (III).

In the registration step (I), the payment card 22 designates one of the hidden data blocks (5A-5H), and allocates one of the hidden data sub-blocks that is to be used for storing the personalization data. In this embodiment, the registration step (I) is administrated by the platform server 3, and the platform server 3 stores perso permission and relevant data of the hidden data blocks (5A-5H), for example, a registration ID and a corresponding password, and an ID/password combination for accessing the designated one of the hidden data blocks (5A-5H). Therefore, during the perso process, one of the platform server 3 and the authorized organization server 32 retrieves the pre-stored personalization data associated with the designated one of the hidden data blocks (5A-5H), verifies whether the subsequent format step (II) and personalization step (III) are allowed for the designated one of the hidden data blocks (5A-5H), and provides data required by the designated one of the hidden data blocks (5A-5H).

In the format step (II), the designated one of the hidden data blocks (5A-5H) is formatted to conform with the predetermined data type so as to allow the personalization data to be stored therein. In this embodiment, the format step (II) is equivalent to obtaining permission to read/write the hidden area 228. Based on different securing mechanisms adopted for the perso process, the permission is administrated by one of the platform server 3, the authorized organization server 32, the bank system 4 in combination with relevant authority, and the personalization application 271. Specifically, the platform server 3 stores the registration authorizing ID/password combination and the personalization data of the designated one of the hidden data blocks (5A-5H). The platform server 3 is responsible for the perso process of the designated one of the hidden data blocks (5A-5H). The platform server 3 even stores a server network address and relevant data of an authorization organization. The authorization organization server 32 also stores the personalization data of an authorized one of the hidden data blocks (5A-5H) (e.g., format authorizing ID/password combination, format data, personalization data, and a user ID/password combination of the authorized one of the hidden data blocks (5A-5H)). In this way, during the format step (II) and the perso process, one of the platform server 3 and the authorization organization server 32 is able to read the personalization data, to verify whether the format step (II) and the perso process are allowed, and to provide data required by each of the hidden data blocks (5A-5H).

In the personalization step (III), i.e., a personalization data writing operation subsequent to the format step (II), the payment card 22 stores the personalization data in the designated one of the hidden data blocks (5A-5H).

In this embodiment, each of the hidden data sub-blocks is stored with a preset registration ID/password combination for authorizing the registration step (I) and a preset format ID/password combination for authorizing the format step (II).

The payment card 22 receives a registration authorizing ID/password combination, and executes the registration step (I) only when the registration authorizing ID/password combination conforms with the preset registration ID/password combination. Similarly, the payment card 22 receives a format authorizing ID/password combination, and executes the format step (II) only when the format authorizing ID/password combination conforms with the preset format ID/password combination.

Figure 15:
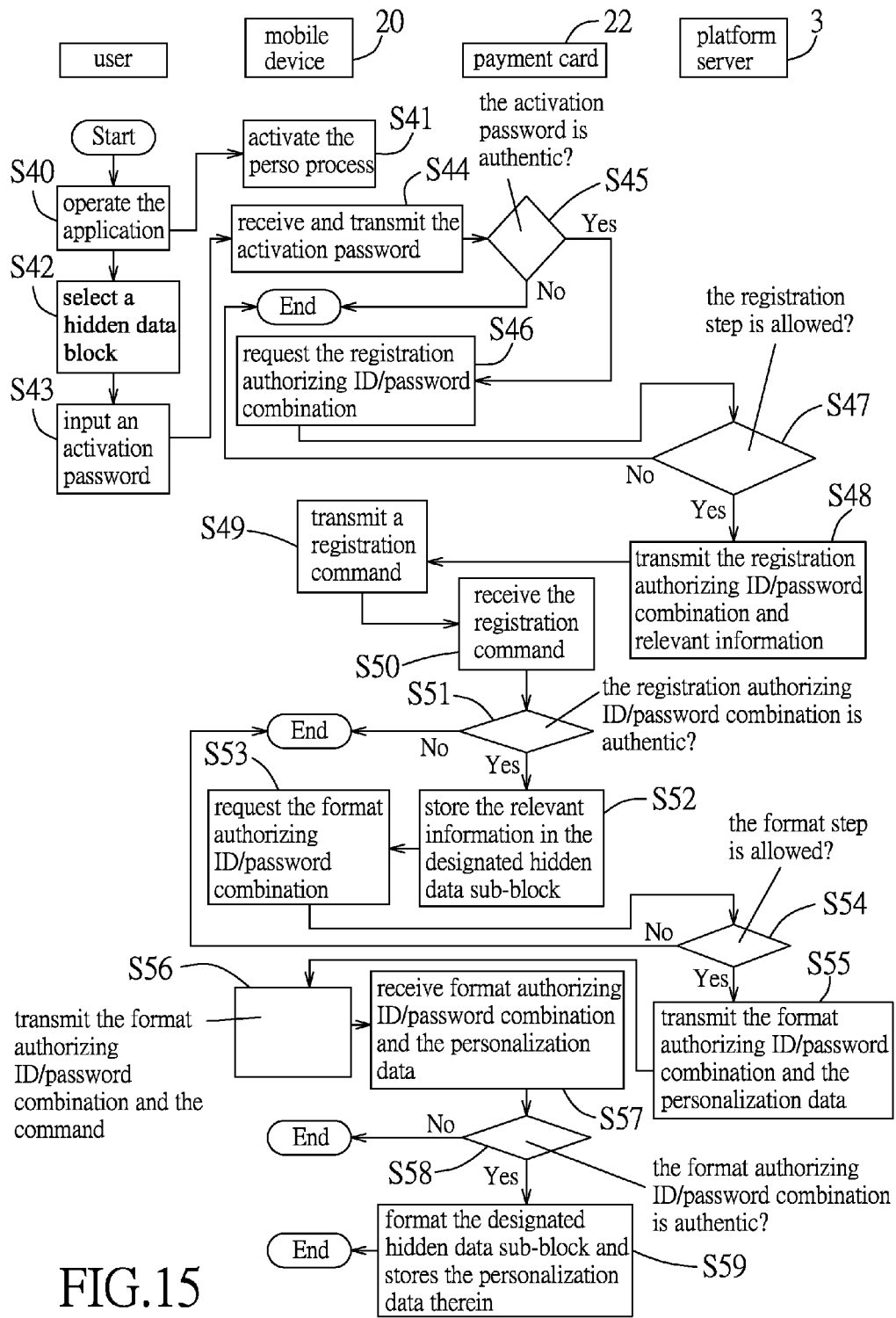
FIG. 15 is a flow chart of the personalization process implemented using a first securing mechanism.

Further referring to FIG. 15, the perso process implemented with a first securing mechanism will now be described in detail.

In step S40, a user operates the personalization application 271 on the mobile device 20, which in response activates the perso process in step S41. In step S42, the user selects one of the hidden data blocks (5A-5H) and one of the hidden data sub-blocks of the selected one of the hidden data blocks (5A-5H) according to the type of data that is to be stored into the payment card 22. In response to the selection, the payment card 22 designates the selected one of the hidden data blocks (5A-5H), and the selected one of the hidden data sub-blocks. For example, one of the hidden data sub-blocks in the hidden data block (5H) is designated to be subjected to the perso process.

In step S43, the user is instructed to input an activation password. The mobile device 20 that receives the activation password then transmits the activation password to the payment card 22 in step S44. The payment card 22 determines whether the activation password is authentic in step S45. When it is determined that the activation password is authentic, the flow proceeds to step S46. Otherwise, the process is terminated.

In step S46, the mobile device 20 communicates with the platform server 3 to request registration data, i.e., the registration authorizing ID/password combination corresponding to the designated hidden data sub-block. In this embodiment, only the platform server 3 is provided with the registration authorizing ID/password combination corresponding to the preset registration ID/password combination which is previously stored in the payment card 22 when the payment card 22 is manufactured. After receiving the request, the platform server 3 reads previously-stored perso data corresponding to the designated hidden data sub-block (i.e., the registration authorizing ID/password combination) so as to determine whether the payment card 22 is allowed, for example by the third party associated with the hidden data block (5H), for the registration step (I) in step S47. When it is determined that the payment card 22 is allowed for the registration step (I), the flow proceeds to step S48. Otherwise, the process is terminated.

In step S48, the platform server 3 transmits the registration authorizing ID/password combination and other relevant information corresponding to the designated hidden data sub-block to the mobile device 20. The mobile device 20 then uses the registration authorizing ID/password combination to transmit a registration command to the payment card 22 in step S49.

Upon receipt of the registration command in step 50, the payment card 22 determines whether the registration authorizing ID/password combination is authentic by comparing the received registration authorizing ID/password combination with the preset registration ID/password combination in step S51. When it is determined that the registration authorizing ID/password combination conforms to the preset registration ID/password combination, the flow proceeds to step S52. Otherwise, the process is terminated.

In step S52, the payment card 22 physically allocates the designated hidden data sub-block within the hidden data block (5H), and stores the relevant information in the designated hidden data sub-block. Specifically, the controller firmware 224 transmits the relevant information to the controller chip 222, which identifies the physical addresses of the designated hidden data sub-block via the sub-list 62, and writes the relevant information into the identified physical addresses, thus completing the registration step (I).

The process then proceeds to the format step (II). In step S53, the mobile device 20 communicates with the platform server 3 to request the format authorizing ID/password combination corresponding to the designated hidden data sub-block, and the personalization data. In this embodiment, only the platform server 3 is provided with the format authorizing ID/password combination corresponding to the preset format ID/password combination which is previously stored in the payment card 22 when the payment card 22 is manufactured. After receiving the request, the platform server 3 reads the previously-stored perso data corresponding to the designated hidden data sub-block (i.e., the format authorizing ID/password combination) so as to determines whether the payment card 22 is allowed for the format step (II) in step S54. When it is determined that the payment card 22 is allowed, for example by the third party associated with the hidden data block (5H), for the format step (II), the flow proceeds to step S55. Otherwise, the process is terminated.

In step S55, the platform server 3 transmits the format authorizing ID/password combination and the personalization data corresponding to the designated hidden data sub-block to the mobile device 20, which then uses the format authorizing ID/password combination to transmit the format authorizing ID/password combination, and a command for allowing subsequent format process to the payment card 22 in step S56.

In response, the payment card 22 receives the format authorizing ID/password combination from the mobile device 20 in step S57, and then, determines whether the format authorizing ID/password combination is authentic by comparing the received format authorizing ID/password combination with the preset format ID/password combination in step S58. When it is determined that the format authorizing ID/password combination conforms to the preset format ID/password combination, the flow proceeds to step S59. Otherwise, the process is terminated.

In step S59, the payment card 22 formats the designated hidden data sub-block and stores the personalization data in the designated hidden data sub-block.

In this embodiment, the list 61 and the sub-list 62 are also updated to reflect the perso process.

Figure 16:
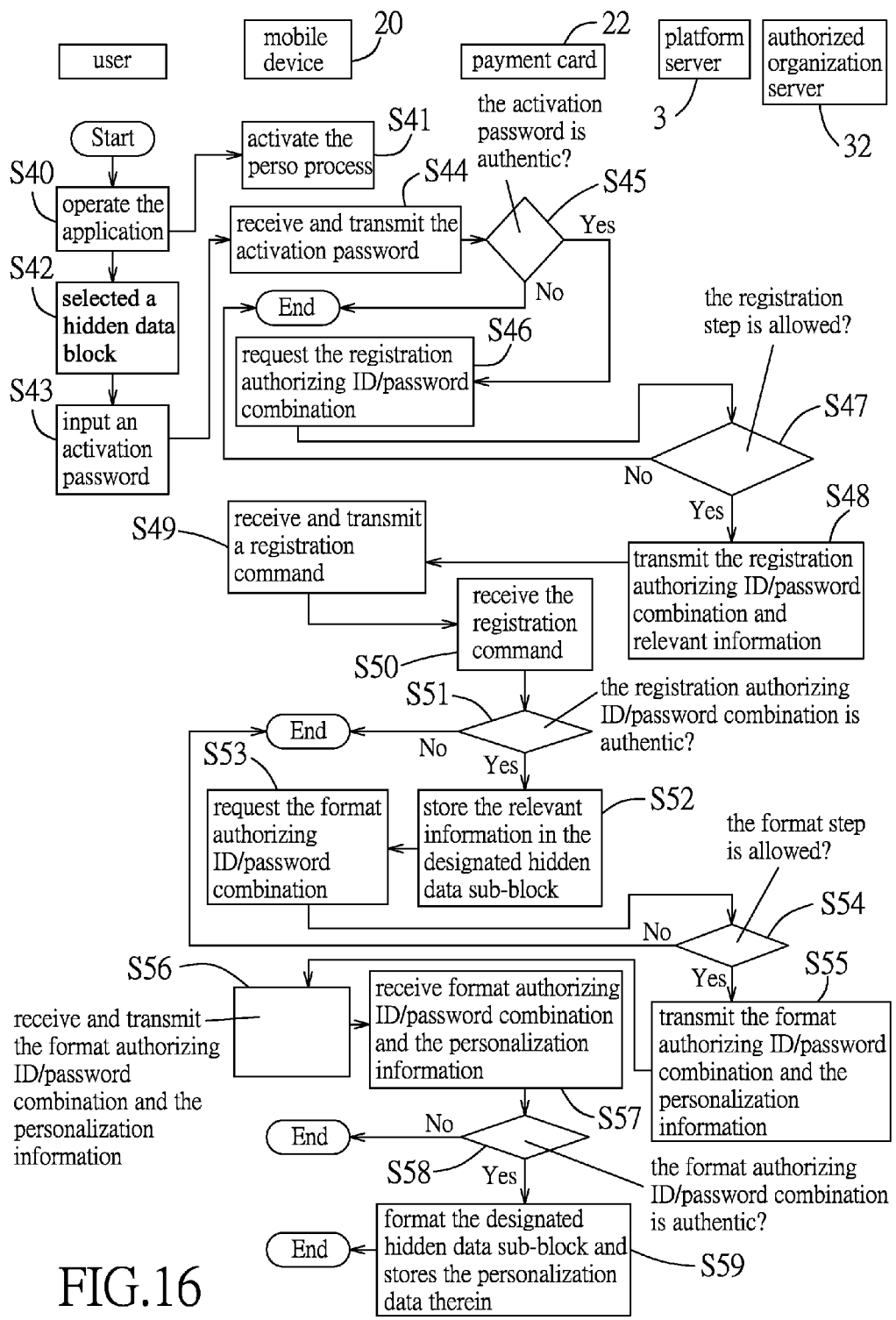
FIG. 16 is a flow chart of the personalization process implemented using a second securing mechanism.

FIG. 16 illustrates steps of the perso process using a second securing mechanism. In the example as shown in FIG. 16, the user may intend to input his/her membership information of a club named "X1" into the payment card 22, and accordingly, one of the hidden data sub-blocks in the hidden data block (5F) will be subjected to the personalization process.

In this example, since the registration step (I) (i.e., steps S41 to S52) is executed in a manner similar to that using the first securing mechanism, details thereof are omitted herein for the sake of brevity.

The main differences between using the first securing mechanism and the second securing mechanism are described as follows. In step S53, the mobile device 20 communicates with the authorized organization server (which, in this case, is a server operated by the club X1) to request the format authorizing ID/password combination corresponding to the designated hidden data sub-block. The authorized organization server 32 instead of the platform server 3 determines whether the payment card 22 is allowed for the format step (II) in step S54.

Additionally, since the personalization data in this case is not intended to be made public for everyone to access, the designated hidden data sub-block may be further assigned with an access ID/password combination to block unauthorized access attempts.

Figure 18A:
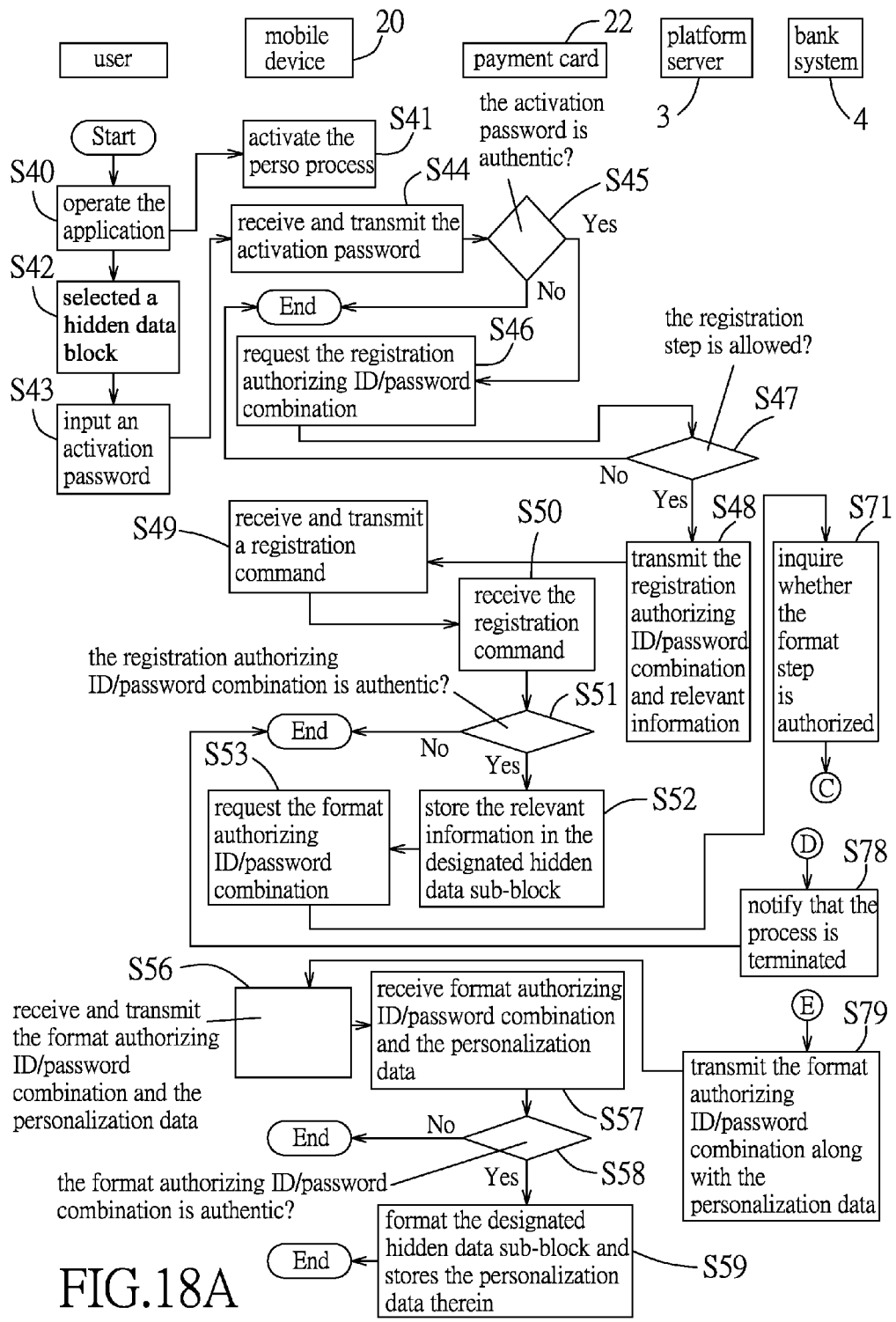
FIGS. 18A and 18B cooperatively illustrate a flow chart of the personalization process implemented using the third securing mechanism.
Figure 18B:
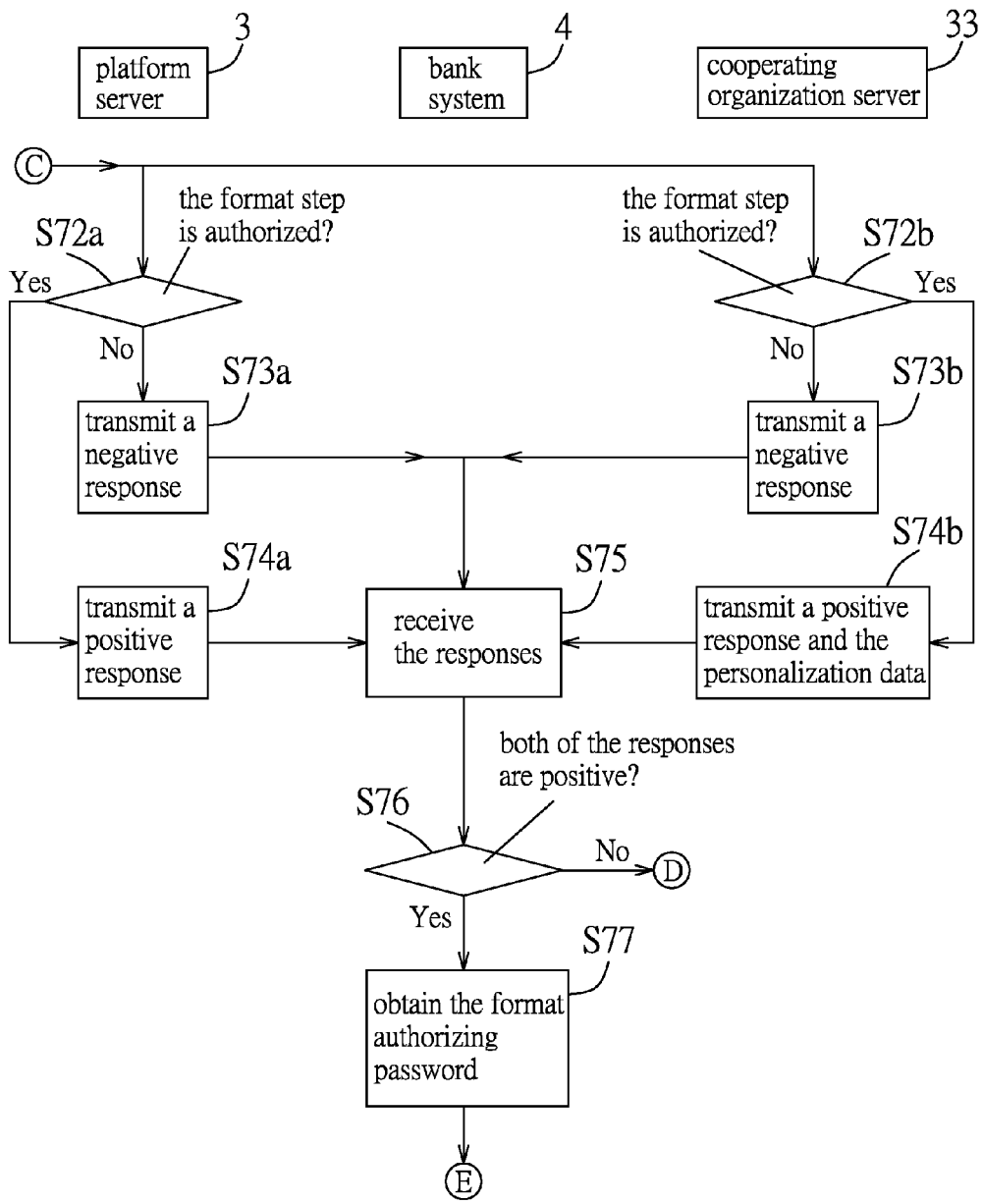

FIGS. 18A and 18B illustrate steps of the perso process using a third securing mechanism. In the example as shown in FIGS. 18A and 18B, the user may intend to input his/her account information of a bank into the payment card 22, and accordingly, one of the hidden data sub-blocks in the hidden data block (5G) will be subjected to the perso process.

In this example, since the registration step (I) (i.e., steps S41 to S52) is executed in a manner similar to that using the first and second securing mechanisms, details thereof are omitted herein for the sake of brevity.

The main differences between using the first securing mechanism and the third securing mechanism are as follows.

A format authorizing password in the format authorizing ID/password combination used in the format step (II) is generated cooperatively by the platform server 3 and the cooperating organization server 33 (which, in this case, is a server operated by a third party other than the bank system 4).

Figure 17:
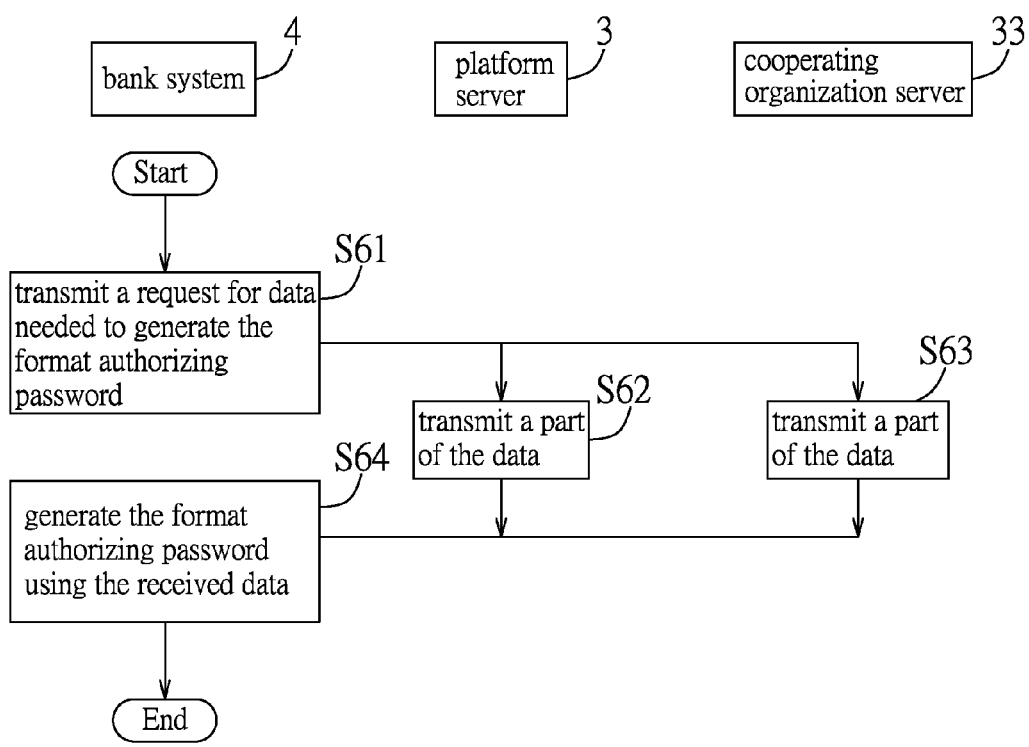
FIG. 17 is a flowchart illustrating a bank system cooperating with a platform server and a cooperating organization server to generate information for implementing the personalization process using a third securing mechanism.

Generating the format authorizing password may be done using the steps depicted in FIG. 17. In step S61, the bank system 4 transmits, to both the platform server 3 and the cooperating organization server 33, a request for data needed to generate the format authorizing password. In response, each of the platform server 3 and the cooperating organization server 33, in respective step S62 or S63, transmits a part of the data needed to generate the format authorizing password back to the bank system 4. The bank system 4 then generates the format authorizing password using the received data in step S64.

Afterwards, in the format step (II) (as depicted in FIG. 18A), in step S53, the mobile device 20 requests the format authorizing ID/password combination from the bank system 4. Then, in step S71, the bank system 4 inquires, from the platform server 3 and the cooperating organization server 33, whether the format step (II) is authorized.

In response (referring to FIG. 18B), the platform server 3 and the cooperating organization server 33 respectively determine whether the format step (II) is authorized in steps S72a and S72b. Specifically, for each of the platform server 3 and the cooperating organization server 33, when it is determined that the format step (II) is not authorized, a negative response is transmitted to the bank system 4 (steps S73a and S73b). On the other hand, when it is determined that the format step is authorized, a positive response is transmitted to the bank system 4 (steps S74a and S74b). It is noted that, when the cooperating organization server 33 determines that the format step (II) is authorized, the personalization data is also transmitted to the bank system 4 in step S74b.

The bank system 4 receives the responses in step S75, determines whether both responses are positive in step S76, and proceeds to step S77 when both responses are positive. When at least one of the responses is negative, in step S78, the bank system 4 transmits a response back to the mobile device 20 notifying that the process is terminated.

The bank system 4, in step S77, obtains the format authorizing password generated in step S64, and, in step S79, transmits the format authorizing ID/password combination along with the personalization data to the mobile device 20. Afterward, the mobile device 20 and the payment card 22 continue with the perso process as described hereinbefore.

Figure 19A:
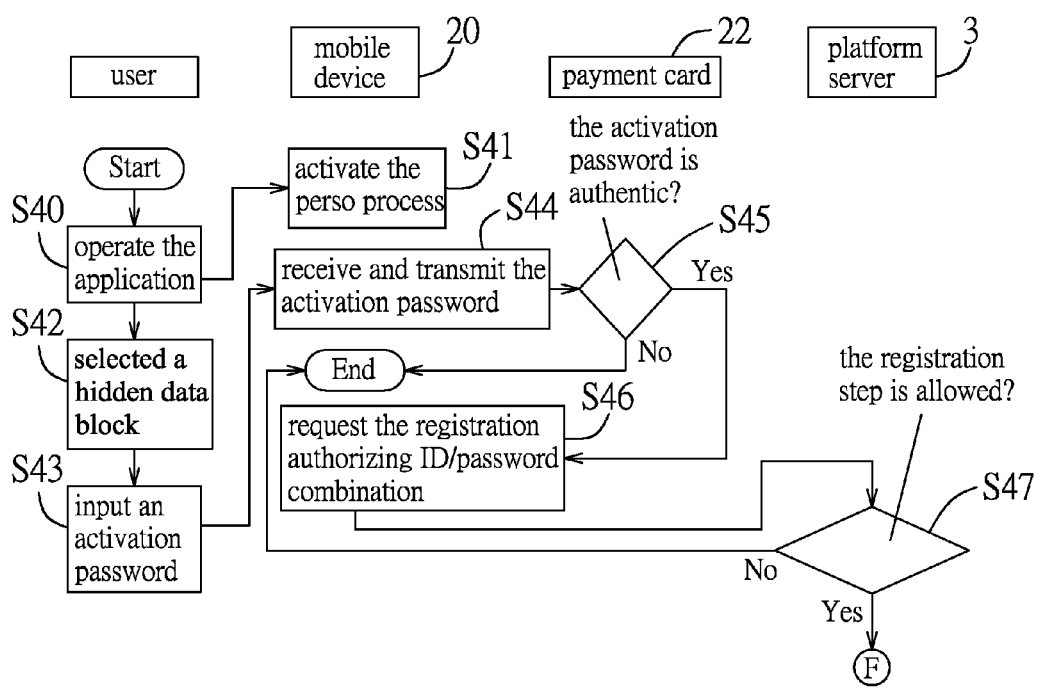
FIGS. 19A and 19B cooperatively illustrate a flow chart of the personalization process implemented using a fourth securing mechanism.
Figure 19B:
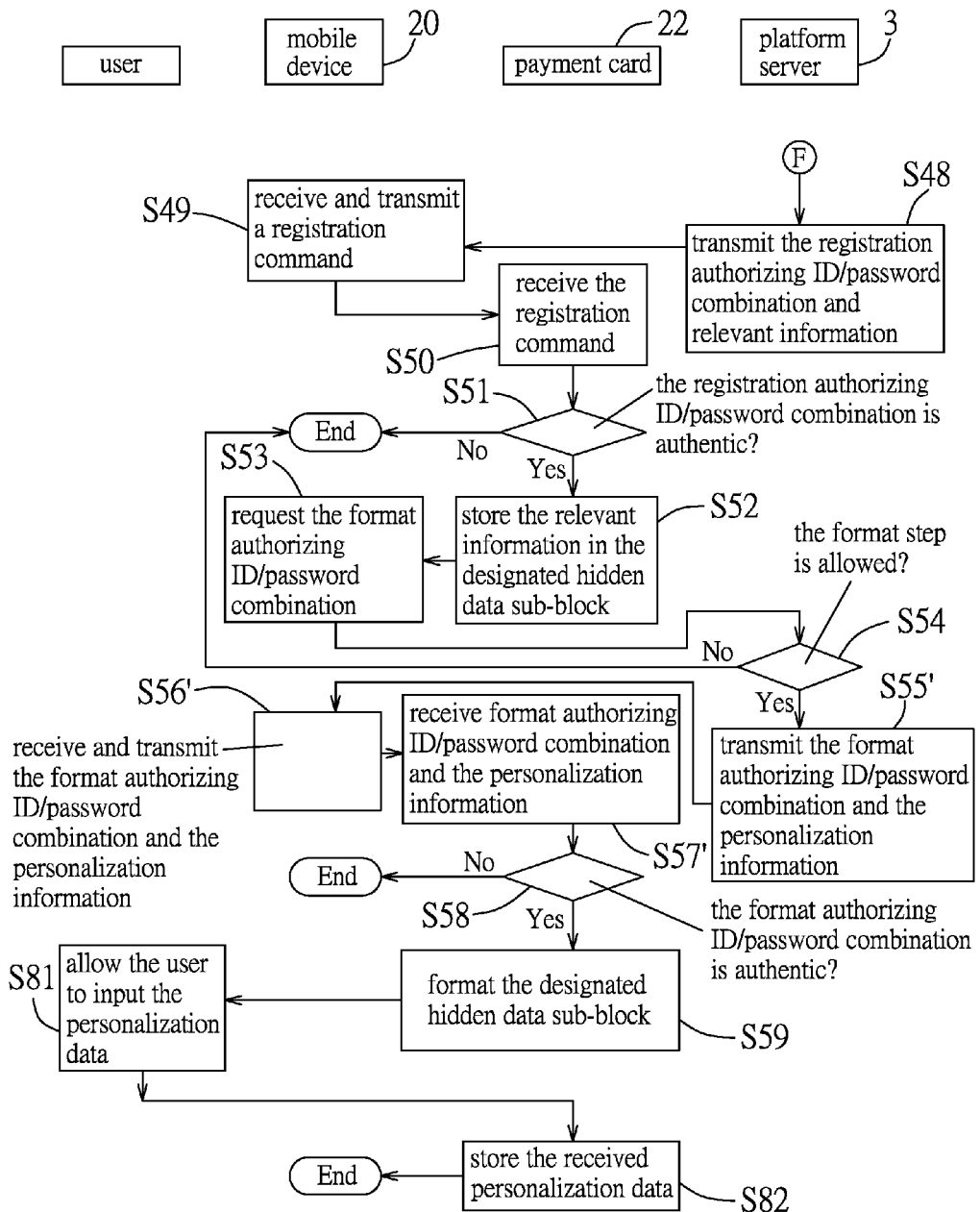

FIGS. 19A and 19B illustrate steps of the perso process using a fourth securing mechanism. In the example as shown in FIGS. 19A and 19B, the user may intend to input his/her first aid information into the payment card 22, and accordingly, one of the hidden data sub-blocks in the hidden data block (5A) will be subjected to the perso process.

In this example, since the registration step (I) (i.e., steps S41 to S52) is executed in a manner similar to that using the first securing mechanism, details thereof are omitted herein for the sake of brevity.

The main differences between using the first securing mechanism and the fourth securing mechanism are described as follows. In step S53, the mobile device 20 does not request for the personalization data from the platform server 3. Instead, after the payment card 22 is formatted in step S59, the mobile device 20 allows the user to input the first aid information in step S81. Then, the mobile device 20 stores the first aid information (used as the personalization data) in the designated hidden data sub-block of the hidden data block (5A) in step S82.

It is noted that, in the cases that the personalization data is received from the platform server 3, the received personalization data may further include an access code which is used for comparison prior to subsequent access of the designated hidden data sub-block of the hidden data block (5A). As such, after the perso process is completed, each of the hidden data sub-blocks will be assigned with a specific access level based on the securing mechanism used.

For example, anyone in possession of the payment card 22 may be authorized to read the hidden data sub-blocks of the hidden data block (5A), but only the user is authorized to write into the same.

The user is authorized to read the hidden data sub-blocks of the hidden data blocks (5B and 5F), but only the authorized organization (a hospital or a social organization) is authorized to write into the same.

The user is authorized to read and write into the hidden data sub-blocks of the hidden data blocks (5C to 5E).

The user is authorized to read the hidden data sub-blocks of the hidden data block (5G), but only the cooperating organization (a bank) is authorized to write into the same.

Anyone in possession of the payment card 22 may be authorized to read the hidden data sub-blocks of the hidden data block (5H), but only the platform server 3 can write into the same.

To sum up, by identifying validity of the payment card 22 based on the payment command that is generated by the mobile device 20, payment made by a fake card can be detected. Moreover, by transmitting the payment command corresponding to the transaction information to the banking server 5 in real time, each payment for the transaction can be processed timely. In this way, losses resulting from payment fraud or transaction records mismatch may be prevented. In addition, the hidden area 228 of the payment card 22 may be partitioned into a plurality of hidden data blocks each associated with a storage security level. Each of the hidden data blocks is further partitioned into a plurality of hidden data sub-blocks, each requiring a personalization process to be activated. As a result, the hidden area 228 may be considered as an expanded information bank with enhanced security.

While the present disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A mobile payment method to be implemented using an electronic device which is configured to interact with a mobile device that is provided with a payment card, the electronic device communicating with a payment institution server, the mobile payment method comprising the steps of:
   receiving transaction information related to a transaction and to a payment for the transaction;
   establishing wireless short-range communication with the mobile device;
   during the wireless short-range communication, transmitting the transaction information to the mobile device through the wireless short-range communication;
   during the wireless short-range communication, receiving a payment command from the mobile device through the wireless short-range communication, the payment command being generated by the mobile device based on at least the transaction information;
   establishing a session with the payment institution server, the session providing a secure communication channel between the electronic device and the payment institution server;
   transmitting the payment command to the payment institution server under the session, the payment command enabling the payment institution server to identify validity of the payment card based on the payment command in response to receipt of the payment command and to process the payment according to the transaction information included in the payment command after identifying the payment card as valid; and
   receiving a payment result from the payment institution server under the session, the payment result being generated by the payment institution server after completing the payment;
   wherein the step of establishing a session includes the sub-steps of:
      transmitting a session request to the payment institution server, the session request enabling the payment institution server to generate a session identification (ID) in response to receipt of the session request and to transmit the session ID to the electronic device;
      after receiving the session ID, generating a first authentication code based on the session ID and a first identification key pre-stored in the electronic device; and
      transmitting the first authentication code to the payment institution server, the first authentication code enabling the payment institution server to
         find a second identification key which is pre-stored in the payment institution server and which corresponds to the first identification key of the electronic device,
         generate a second authentication code based on the session ID generated in response to receipt of the session request and the second identification key thus found,
         determine whether the first authentication code received from the electronic device conforms with the second authentication code thus generated, and
         transmit a session response to the electronic device so as to establish the session when it is determined that the first authentication code conforms with the second authentication code.

2. The mobile payment method according to claim 1, the electronic device and the mobile device being provided with Near Field Communication (NFC) capabilities, wherein the step of establishing wireless short-range communication includes:
   automatically establishing an NFC communication with the mobile device as the wireless short-range communication when the electronic device and the mobile device are brought into proximity of each other.

3. The mobile payment method according to claim 2, prior to the step of establishing wireless short-range communication, further comprising the step of:
   generating to-be-authenticated data that includes the transaction information;
   wherein the step of transmitting the transaction information includes, during the NFC communication, transmitting the to-be-authenticated data to the mobile device through the NFC communication;
   wherein, in the step of receiving a payment command, during the NFC communication, the to-be-authenticated data enables
      the mobile device to relay the to-be-authenticated data to the payment card,
      the payment card to generate a transaction authentication code (TAC) based on the to-be-authenticated data and to transmit the TAC to the mobile device, and
      the mobile device to compose the payment command using the TAC and to transmit the payment command to the electronic device through the NFC communication.

4. The mobile payment method according to claim 3,
wherein, in the step of receiving a payment command, during the NFC communication, the to-be-authenticated data further enables the payment card to generate the TAC using a secret key stored in the payment card; and
wherein, in the step of transmitting the payment command, the payment command further enables the payment institution server to
generate a confirmation code based on the to-be-authenticated data included in the payment command using the same secret key, and
compare the TAC and the confirmation code, so as to identify validity of the payment card.

5. The mobile payment method according to claim 1, further comprising, after the step of receiving transaction information, the step of:
disabling alterations to be made on the transaction information.

6. A mobile payment method to be implemented using a mobile device which is provided with a payment card and which is configured to interact with an electronic device, the mobile device and the electronic device communicating with a payment institution server, the mobile payment method comprising the steps of:
establishing, by the mobile device, a wireless short-range communication with the electronic device;
during the wireless short-range communication, receiving, by the mobile device, transaction information from the electronic device through the wireless short-range communication, the transaction information being related to a transaction and to a payment for the transaction;
during the wireless short-range communication, generating a payment command based on at least the transaction information, and transmitting the payment command thus generated to the electronic device through the wireless short-range communication, the payment command being provided by the electronic device to the payment institution server under a session established therebetween and enabling the payment institution server to identify validity of the payment card based on the payment command in response to receipt of the payment command and to process the payment according to the transaction information included in the payment command after identifying the payment card as valid; and
receiving, by the mobile device, a payment result from the payment institution server, the payment result being generated by the payment institution server after completing the payment;
wherein the electronic device establishes the session with the payment institution server by performing the steps of:
transmitting a session request to the payment institution server, the session request enabling the payment institution server to generate a session identification (ID) in response to receipt of the session request and to transmit the session ID to the electronic device;
after receiving the session ID, generating a first authentication code based on the session ID and a first identification key pre-stored in the electronic device; and
transmitting the first authentication code to the payment institution server, the first authentication code enabling the payment institution server to
find a second identification key which is pre-stored in the payment institution server and which corresponds to the first identification key of the electronic device,
generate a second authentication code based on the session ID generated in response to receipt of the session request and the second identification key thus found,
determine whether the first authentication code received from the electronic device conforms with the second authentication code thus generated, and
transmit a session response to the electronic device so as to establish the session when it is determined that the first authentication code conforms with the second authentication code.

7. The mobile payment method according to claim 6, the mobile device and the electronic device being provided with Near Field Communication (NFC) capabilities, wherein the step of establishing a wireless shot-range communication includes:
automatically establishing, by the mobile device, an NFC communication with the electronic device as the wireless short-range communication when the electronic device and the mobile device are brought into proximity of each other.

8. The mobile payment method according to claim 7,
wherein the step of receiving transaction information includes receiving, by the mobile device, to-be-authenticated data from the electronic device during the NFC communication, the to-be-authenticated data being generated by the electronic device and including the transaction information; and
wherein the step of generating a payment command includes, during the NFC communication,
relaying, by the mobile device, the to-be-authenticated data to the payment card,
by the payment card, generating a transaction authentication code (TAC) based on the to-be-authenticated data, and transmitting the TAC to the mobile device, and
by the mobile device, composing the payment command using the TAC, and transmitting the payment command to the electronic device through the NFC communication.

9. The mobile payment method according to claim 8,
wherein the step of generating a payment command further includes generating, by the payment card, the TAC using a secret key stored in the payment card; and
wherein the payment command further enables the payment institution server to
generate a confirmation code based on the to-be-authenticated data included in the payment command using the same secret key, and
compare the TAC and the confirmation code, so as to identify validity of the payment card.

10. The mobile payment method of claim 6, prior to the step of establishing a wireless shot-range communication, further comprising:
outputting, by the mobile device, an instruction to prompt user input of an access password;
upon receipt of the access password, transmitting, by the mobile device, the access password to the payment card;
by the payment card, verifying the access password, and transmitting an access-grant instruction to the mobile device when the access password is correct; and
upon receipt of the access-grant instruction, clearing, by the mobile device, the access password temporarily stored therein.

11. A mobile payment apparatus configured to interact with an electronic device, which communicates with a payment institution server, the mobile payment apparatus comprising:

a mobile device which includes
  a processor,
  a memory unit coupled to said processor and storing a payment application therein,
  a card slot coupled to said processor, and removably inserted with a payment card, thereby enabling access to the payment card using said mobile device,
  a short-range communication unit coupled to said processor and configured to communicate with the electronic device; and
  a communication unit coupled to said processor and configured to communicate with the payment institution server;
wherein said payment application, when executed by said processor, causes said mobile payment apparatus to
  establish a wireless short-range communication with the electronic device,
  during the wireless short-range communication, receive transaction information from the electronic device through the wireless short-range communication, the transaction information being related to a transaction and to a payment for the transaction,
  during the wireless short-range communication, generate a payment command based on at least the transaction information, and transmit the payment command thus generated to the electronic device through the wireless short-range communication, the payment command being provided by the electronic device to the payment institution server and enabling the payment institution server to identify validity of the payment card based on the payment command in response to receipt of the payment command and to process the payment according to the transaction information included in the payment command after identifying the payment card as valid, and
  receive a payment result from the payment institution server, the payment result being generated by the payment institution server after completing the payment;
wherein said mobile device is further configured to execute a personalization application to perform a personalization process for said payment card, said payment card including:
a control module including a controller chip, a controller firmware and an application program interface (API); and
a storage unit including a hidden area that is only accessible to the personalization application via said controller firmware and said API after a certain authorization sequence has been done;
wherein
  said hidden area is partitioned into a plurality of hidden data blocks, each of said hidden data blocks being associated with a storage security level and being configured for storing a predetermined data type of personalization data, and
  for each of the hidden data blocks, said controller chip is configured to perform the personalization process for storing the personalization data with a predetermined one of a plurality of securing mechanisms that corresponds to the storage security level of the hidden data block; wherein the personalization process includes:
a registration step, in which one of the hidden data blocks is selected to be used for storing the personalization data;
a format step, in which the one of the hidden data blocks is formatted to conform with the predetermined data type so as to allow the personalization data to be stored therein; and
a personalization step, in which said payment card stores the personalization data in the one of the hidden data blocks;
wherein each of the hidden data blocks is partitioned into a plurality of hidden data sub-blocks, in the registration step, said payment card further designates one of the hidden data sub-blocks in the one of the hidden data blocks to be used for storing the personalization data, and in the format step, the one of the hidden data sub-blocks is formatted;
wherein each of the hidden data sub-blocks is stored with a preset registration ID/password combination for authorizing the registration step and a preset format ID/password combination for authorizing the format step;
wherein said payment card receives a registration authorizing ID/password combination, and executes the registration step only when the registration authorizing ID/password combination conforms with the preset registration ID/password combination;
wherein said payment card receives a format authorizing ID/password combination, and executes the format step only when the format authorizing ID/password combination conforms with the preset format ID/password combination;
wherein said payment card is configured to perform the personalization process according to one of first to fourth securing mechanisms;
wherein, in the first securing mechanism, the registration authorizing ID/password combination, the format authorizing ID/password combination and the personalization data are received from a platform server;
wherein, in the second securing mechanism, the registration authorizing ID/password combination and the personalization data are received from the platform server, and the format authorizing ID/password combination is received from an authorized organization server that is authorized by the platform server to provide the format authorizing ID/password combination;
wherein, in the third securing mechanism, the registration authorizing ID/password combination and the personalization data are received from the platform server, the format authorizing ID/password combination is received from a third party, and the format authorizing ID/password combination is generated cooperatively by the platform server and a cooperating organization server; and
wherein, in the fourth securing mechanism, the registration authorizing ID/password combination and the format authorizing ID/password combination are received from a platform server, and the personalization data is received from the personalization application via said controller firmware and said API.

12. The mobile payment apparatus according to claim 11, wherein the registration step includes the sub-steps of
  in response to receipt of a registration command, designating a hidden data sub-block that is partitioned from the one of the hidden data blocks, and
  receiving a format authorizing ID/password combination from a first party that operates under one of the securing mechanisms of the one of the hidden data blocks;
wherein, in the format step, when it is determined that the received format authorizing ID/password combination conforms with a preset format ID/password combination stored in the designated one of the hidden data sub-blocks, formatting the designated one of the hidden data sub-blocks; and wherein, in the personalization step, storing the personalization data in the designated one of the hidden data sub-blocks.

* * * * *

UNITED STATES PATENT AND TRADEMARK OFFICE
CERTIFICATE OF CORRECTION

PATENT NO. : 9,311,636 B2
APPLICATION NO. : 14/623338
DATED : April 12, 2016
INVENTOR(S) : Chien-Kang Yang It is certified that error appears in the above-identified patent and that said Letters Patent is hereby corrected as shown below:

On the title page of US Patent No. 9,311,636 please add the following Foreign Application Priority Data section after the Related US Application Data section:

Sept. 11, 2013 (TW) . . . . . . . . . . . . . 102217086

Signed and Sealed this
Twenty-sixth Day of July, 2016

Michelle K. Lee
*Director of the United States Patent and Trademark Office*